US009881014B1

(12) United States Patent
Bono et al.

(10) Patent No.: US 9,881,014 B1
(45) Date of Patent: Jan. 30, 2018

(54) SNAP AND REPLICATE FOR UNIFIED DATAPATH ARCHITECTURE

(71) Applicant: EMC Corporation, Hopkinton, MA (US)

(72) Inventors: Jean-Pierre Bono, Westborough, MA (US); Himabindu Tummala, South Grafton, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 674 days.

(21) Appl. No.: 14/319,622

(22) Filed: Jun. 30, 2014

(51) Int. Cl.
G06F 17/30 (2006.01)

(52) U.S. Cl.
CPC .. *G06F 17/30088* (2013.01); *G06F 17/30575* (2013.01)

(58) Field of Classification Search
CPC ......... G06F 17/30088; G06F 17/30575; G06F 17/30174; G06F 3/06; G06F 11/1435; G06F 11/1471; G06F 17/3023; H04L 67/1095
USPC ........................................ 707/639
See application file for complete search history.

(56) References Cited

U.S. PATENT DOCUMENTS

| 7,631,155 B1 | 12/2009 | Bono et al. |
| 7,769,722 B1* | 8/2010 | Bergant ............. G06F 11/2097 707/681 |
| 8,706,833 B1 | 4/2014 | Bergant et al. |
| 9,286,007 B1 | 3/2016 | Bono |
| 2007/0185973 A1* | 8/2007 | Wayda ................. G06F 3/0607 709/217 |

OTHER PUBLICATIONS

"EMC Celerra Replicator—Advanced IP Storage Protection", (PowerPoint Presentation), EMC Corporation, EMC Corporation, Hopkinton, MA, 2008.
"Emc RecoverPoint Family", (Data Sheet H2769), EMC Corporation, EMC Corporation, Hopkinton, MA, Aug. 2013.
"EMC VNX Snapshots", (White Paper), EMC Corporation, EMC Corporation, Hopkinton, MA, Dec. 2013.

* cited by examiner

*Primary Examiner* — Evan Aspinwall
(74) *Attorney, Agent, or Firm* — BainwoodHuang

(57) ABSTRACT

A data protection technique maintains replicas of both a data object and its snaps by conducting replication operations on the data object between a source and a destination. The technique includes generating a pair of content-consistent snaps, one snap of the data object at the source and one snap of its replica at the destination. A common snap signature identifies both snaps of the pair of content-consistent snaps. Orchestration of replication ensures that both snaps of the pair share the same content. The two snaps may thus be used interchangeably, with the snap of the replica at the destination providing essentially a backup of the snap of the data object at the source.

16 Claims, 19 Drawing Sheets

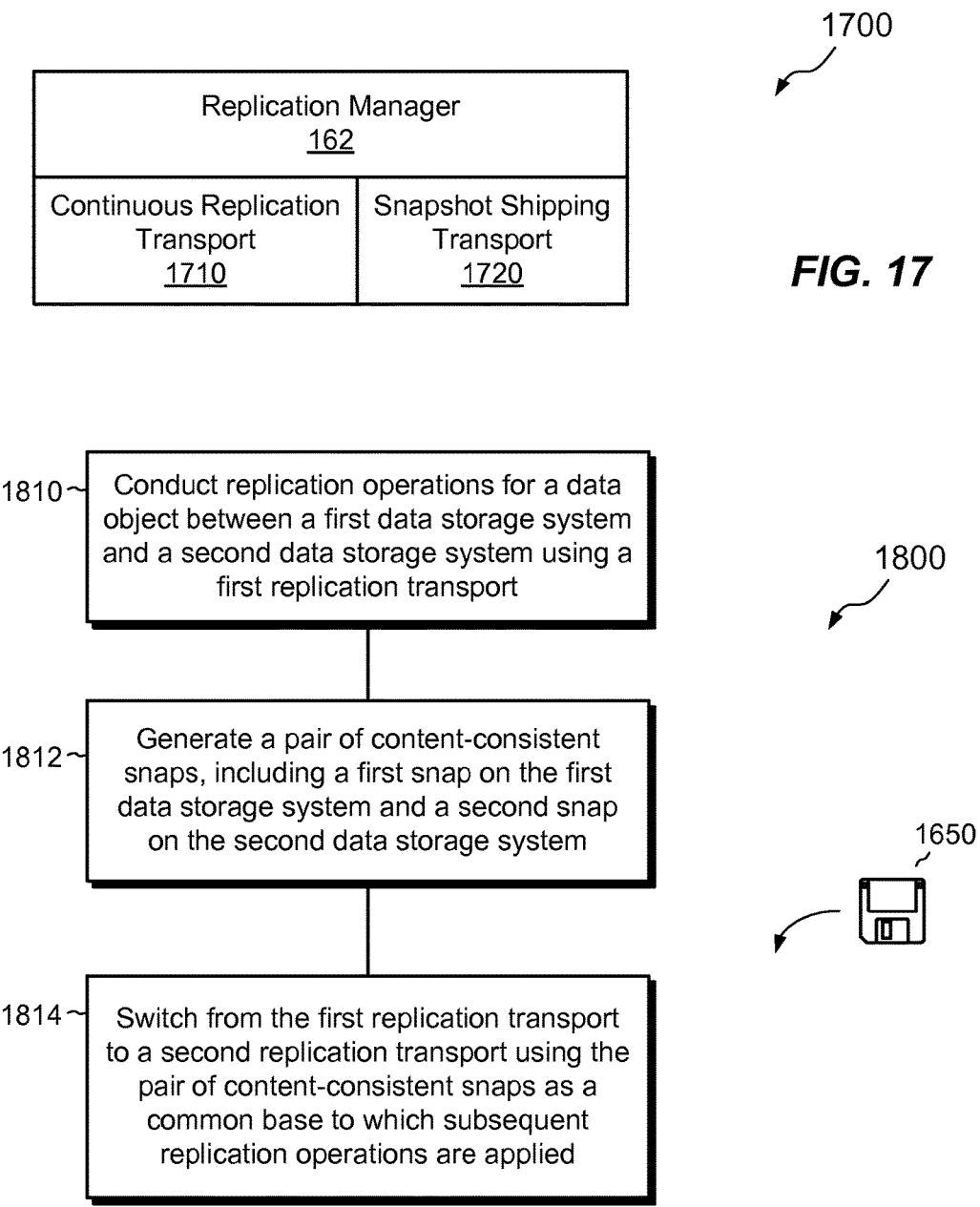

SNAP AND REPLICATE FOR UNIFIED DATAPATH ARCHITECTURE

BACKGROUND

Data storage systems commonly employ replication technologies for protecting the data they store. Conventional replication solutions include continuous replication solutions and snapshot shipping solutions. Continuous replication solutions operate on storage volumes, e.g., LUNs (Logical Unit Numbers), using Fibre Channel or iSCSI (Internet Small Computer System Interface), whereas snapshot shipping solutions operate on file systems and files, e.g., using NFS (Network File System), CIFS (Common Internet File System), or SMB 3.0 (Server Message Block).

A well-known solution for continuous replication is the RecoverPoint system available from EMC Corporation of Hopkinton, Mass. RecoverPoint systems include a replication splitter, one or more local replication appliances, and one or more remote replication appliances connected to a remote data storage system configured as a destination. As a data storage system at a source processes IO requests specifying data to be written to a particular LUN, the replication splitter intercepts the IO requests and sends them to the local replication appliance (or appliances). The local replication appliance communicates with the remote replication appliance, and the two appliances orchestrate the storage of the data specified in the IO requests at the destination. In this manner, the destination is made to store a redundant copy of the data stored on the LUN, and the redundant copy may be used to recover the contents of the LUN in the event of a failure at the source.

A well-known solution for snapshot shipping replication is the Celerra Replicator™ V2, also available from EMC Corporation of Hopkinton, Mass. Replicator V2 includes software for performing replication on files and file systems. Replicator V2 operates by taking snaps (i.e., point in time copies) of files and file systems at a source, comparing current snaps with previous snaps, identifying differences, and sending the differences to a destination. The destination receives the differences and applies them to replicas maintained there, to update the replicas with changes made at the source.

Conventional replication may be synchronous or asynchronous. "Synchronous" replication proceeds in band with IO requests as the requests are processed at a source site. The source site typically sends data specified in individual IO requests to a destination site on an individual basis, e.g., one-by-one, as the IO requests are processed at the source. In contrast, "asynchronous" replication proceeds out of band with individual IO requests, with replicas generated, for example, on demand, at regular intervals, and/or in response to particular events. The above-described RecoverPoint system can perform both synchronous and asynchronous replication. The above-described Replicator V2 can perform asynchronous replication, as it operates based on snaps acquired out of band with IO processing.

SUMMARY

Conventional replication solutions maintain replicas of data objects at destination sites. Unfortunately, however, conventional replication solutions do not maintain replicas of snaps. Thus, for example, if a user takes a snap of a data object on a source system, the snap itself will generally not be replicated to the destination. Although users can make backups of their source systems, e.g., using tape or by making bulk copies over a network, these backups are performed out of band with replication operations and are often directed to different sites or facilities. The destination site for replicating the data object is thus typically not also a repository for snaps.

In contrast with conventional solutions, an improved technique for data protection maintains replicas of both a data object and its snaps by conducting replication operations on the data object between a source and a destination. The improved technique includes generating a pair of content-consistent snaps, one snap of the data object at the source and one snap of its replica at the destination. A common snap signature identifies both snaps of the pair of content-consistent snaps. Orchestration of replication ensures that both snaps of the pair share the same content. The two snaps may thus be used interchangeably, with the snap of the replica at the destination providing essentially a backup of the snap of the data object at the source. The improved technique can be repeated for any number of data objects and any number of snaps. Snaps are created on the destination without having to copy them from the source, but rather by independently snapping the replica at the destination, where the contents of the replica are kept in sync with those of the data object using replication.

In some examples, snaps and their replicas can have different lifespans. For instance, snaps on the source may be recycled weekly, whereas snaps on the destination may be recycled monthly or yearly. Snaps initially forming backups can thus become new originals over time.

The improved technique can operate with a variety of replication technologies, including continuous replication, snapshot shipping replication, synchronous replication, and asynchronous replication. In some examples, the improved technique employs one replication technology for performing replication operations initially, and then after taking a pair of content-consistent snaps, one snap at the source and another snap at the destination, employs a second replication technology going forward, using the pair of content-consistent snaps as a common base. In some examples, replication technologies may be switched at will in this fashion over time.

In accordance with improvements hereof, certain embodiments are directed to a method of managing data protection for a data object stored on a first data storage system. The method includes conducting replication operations on the data object between the first data storage system and a second data storage system to maintain a replica of the data object on the second data storage system as the data object on the first data storage system changes. In a course of conducting the replication operations for replicating the data object on the first data storage system to the replica on the second data storage system, the method further includes generating a pair of content-consistent snaps, including a first snap of the data object on the first data storage system and a second snap of the replica of the data object on the second data storage system. The method still further includes applying a snap signature that identifies the first snap from among other snaps to both the first snap and the second snap, the second snap thereby having the same signature as the first snap and providing a parallel copy of the first snap that has been independently generated on the second data storage system from the replica of the data object on the second data storage system.

Other embodiments are directed to a system constructed and arranged to perform the method described above. Still other embodiments are directed to a computer program product. The computer program product includes a set of non-transitory, computer-readable media having instructions which, when executed on one or more processors, cause the processors to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

FIG. 17 is a diagram showing an example relationship between a replication manager and different replication transports;

FIG. 18 is a flowchart showing an example process for switching replication transports using a pair of content-consistent snaps as a common base;

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for data protection maintains replicas of both a data object and its snaps by conducting replication operations on the data object between a source and a destination. The improved technique includes generating a pair of content-consistent snaps, one snap of the data object at the source and one snap of its replica at the destination. A common snap signature identifies both snaps of the pair of content-consistent snaps. Orchestration of replication ensures that both snaps of the pair share the same content. The two snaps may thus be used interchangeably, with the snap of the replica at the destination providing essentially a backup of the snap of the data object at the source.

This document is presented in sections to assist the reader in identifying desired information. In the material that follows:

Section I presents an example environment in which improved techniques hereof may be practiced and describes, inter alia, a unified datapath architecture for expressing both block-based objects and file-based objects as respective underlying volumes and underlying files, which enables the use of a common replication approach for both block-based and file-based objects.

Section II presents particular example improvements for effecting synchronous replication of both block-based and file-based objects on a per-user-object basis under the direction of a common replication manager.

Section III presents particular improvements for unifying both synchronous and asynchronous replication of both block-based and file-based objects.

Section IV presents particular improvements for extending synchronous replication on a per-user-object basis to VSPs (Virtualized Storage Processors), where each VSP is treated as a data object and replication on VSPs is conducted on a per-VSP basis.

Section V presents particular improvements for performing snap-and-replicate operations on a data object at source and destination sites to generate content-consistent snaps with shared snap signatures.

Section VI presents particular improvements for changing replication transports for replicating a data object using content-consistent snaps as a common base.

Embodiments claimed in the instant patent document find support in all sections presented herein but especially in Sections V and VI.

Figure 1:
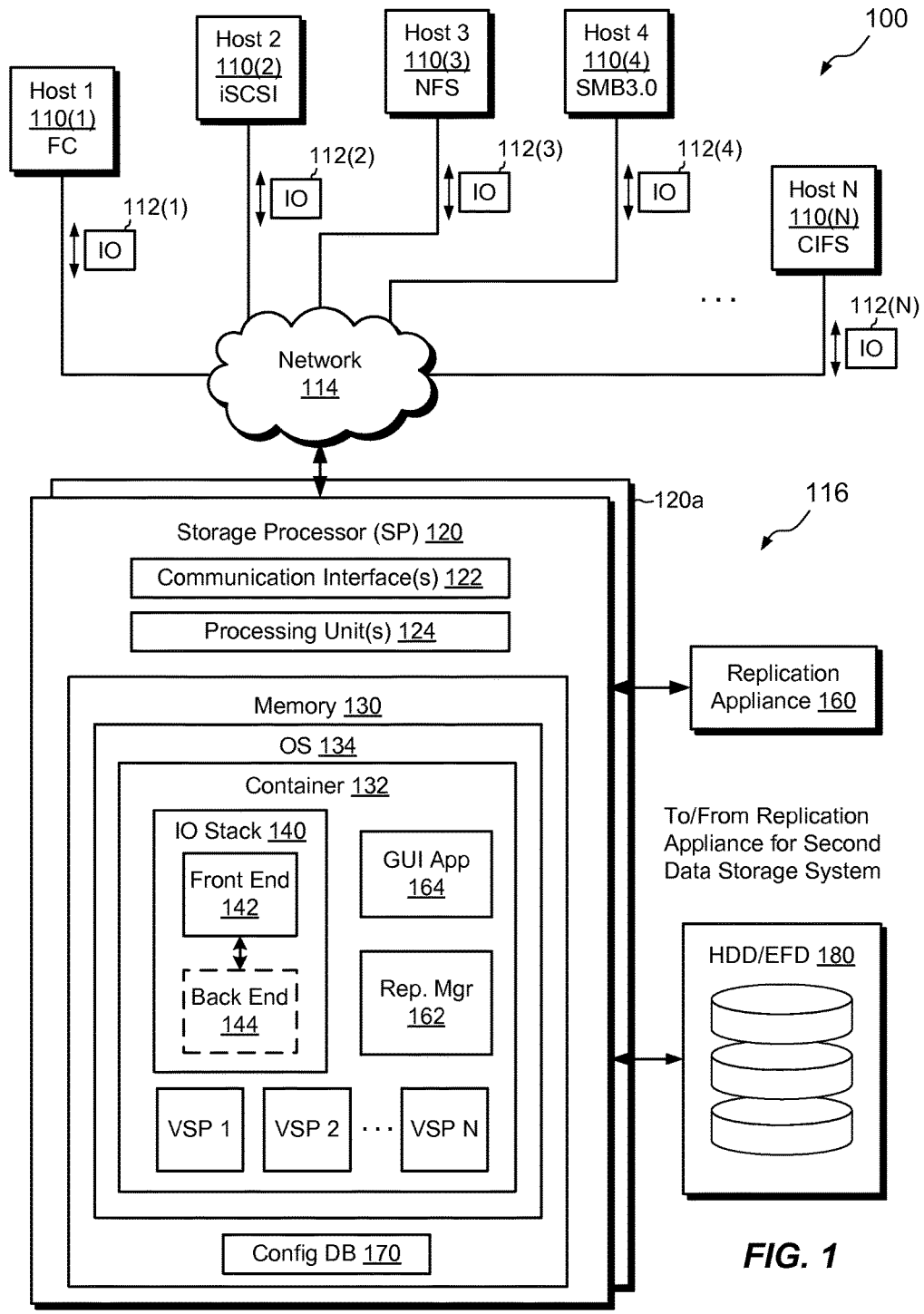
FIG. 1 is a block diagram showing an example environment in which improved techniques hereof may be practiced, the example environment including a data storage system having a storage processor.

I) Example Environment Including Unified Datapath Architecture:

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. The data storage system 116 may include multiple SPs like the SP 120 (see, for example, a second SP 120a). For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the host 110(1) can connect to the SP 120 using Fibre Channel (e.g., through a SAN). The hosts 110(2-N) can connect to the SP 120 using TCP/IP, to support, for example, iSCSI, NFS, SMB 3.0, and CIFS. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, adapters such as SCSI target adapters and network interface adapters for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel (not shown) and can communicate with one another using inter-process communication (IPC) mediated by the kernel. Containers are well-known features of Unix, Linux, and other operating systems.

In the example of FIG. 1, only a single container 132 is shown. Running within the container 132 is an IO stack 140, a replication manager 162, a Graphical User Interface (GUI)-based application 164, and multiple VSPs (Virtualized Storage Processors) VSP 1 to VSP N. A VSP is a collection of data objects, internal file systems, and servers (e.g., NFS and/or CIFS servers), which together provide a mechanism for grouping objects and providing a common set of network interfaces such that the VSP appears from outside the SP 120 as similar to a physical SP. More information about VSPs may be found in copending U.S. patent application Ser. No. 13/828,294, filed Mar. 14, 2013, the contents and teachings of which are hereby incorporated by reference in their entirety. Although certain components are shown residing within the container 132, alternatively different components reside in different containers. For example, the GUI-application 164 may run within a dedicated container and communicate with the replication manager 162 using IPC.

The IO stack 140 provides an execution path for host IOs (e.g., IO requests 112(1-N)) and includes a front end 142 and a back end 144. In alternative arrangements, the back end 144 is located on another SP (e.g., SP 120a) or is provided in a block-based array connected to the SP 120 (e.g., in a gateway configuration).

The replication appliance 160 assists in performing continuous replication of both block-based objects and file-based objects to a second data storage system, which may be located locally to the data storage system 116 or remotely. In an example, the replication appliance 160 takes the form of a hardware unit, and multiple such units may be provided, e.g., for supporting strong data compression and other advanced features. For purposes of this document, it is understood that this document refers to the replication appliance 160 as a single component, although that component include any number of units, which operate in coordination with one another, e.g., in a cluster.

The replication manager 162 controls the establishment of replication settings on particular data objects, including VSPs. The replication manager 162 establishes replication settings on a per-data-object basis, conducts replication sessions with replica sites, and orchestrates replication activities, including recovery and failover activities.

The GUI application 164 provides a user interface for configuring the replication manager 162, e.g., for establishing replication settings on particular data objects. As the IO stack 140, replication appliance 160 (optionally), replication manager 162, and GUI application 164 all run within the same container 132, the IO stack 140, replication appliance 160 (optionally), and replication manager 162 can communicate with one another using APIs (application program interfaces) and pointer passing and without the need to use IPC.

The memory 130 is further seen to include a configuration database 170. The configuration database 170 stores configuration information pertaining to the data storage system 116, including information about the VSPs 1-N and the data objects with which they are associated. In other implementations, the data storage system 116 stores the configuration database 170 elsewhere, such as or in the storage 180, on a disk drive of flash drive separate from the SP 120 but accessible to the SP 120, e.g., over a backplane or network, or in some other location.

In operation, the hosts 110(1-N) issue IO requests 112(1-N) to the data storage system 116. The IO requests 112(1-N) may include both block-based requests and file-based requests. The SP 120 receives the IO requests 112(1-N) at the communication interfaces 122 and passes the IO requests to the IO stack 140 for further processing. At the front end 142, processing may include mapping IO requests directed to LUNs, host file systems, vVOLs (virtual volumes, e.g., as soon available for VMware, Inc. of Palo Alto, Calif.), and other data objects to block-based requests presented to internal volumes, as well as mapping the internal volumes to respective files stored in a set of internal file systems of the data storage system 116. Host IO requests received at the SP 120 for reading and writing block-based objects and file-based objects are thus converted to reads and writes of respective volumes, which are then converted to reads and writes of respective files. As will be described further below, the front end 142 may perform continuous synchronous replication at the level of the internal volumes, where the front end 142 presents both block-based objects and file-based objects in block-based form. After processing by the front end 142, the IO requests propagate to the back end 144, where the back end 144 executes commands for reading and/or writing the physical storage 180, agnostically to whether the data read and/or written is directed to a block-based object or a file-based object.

Figure 2:
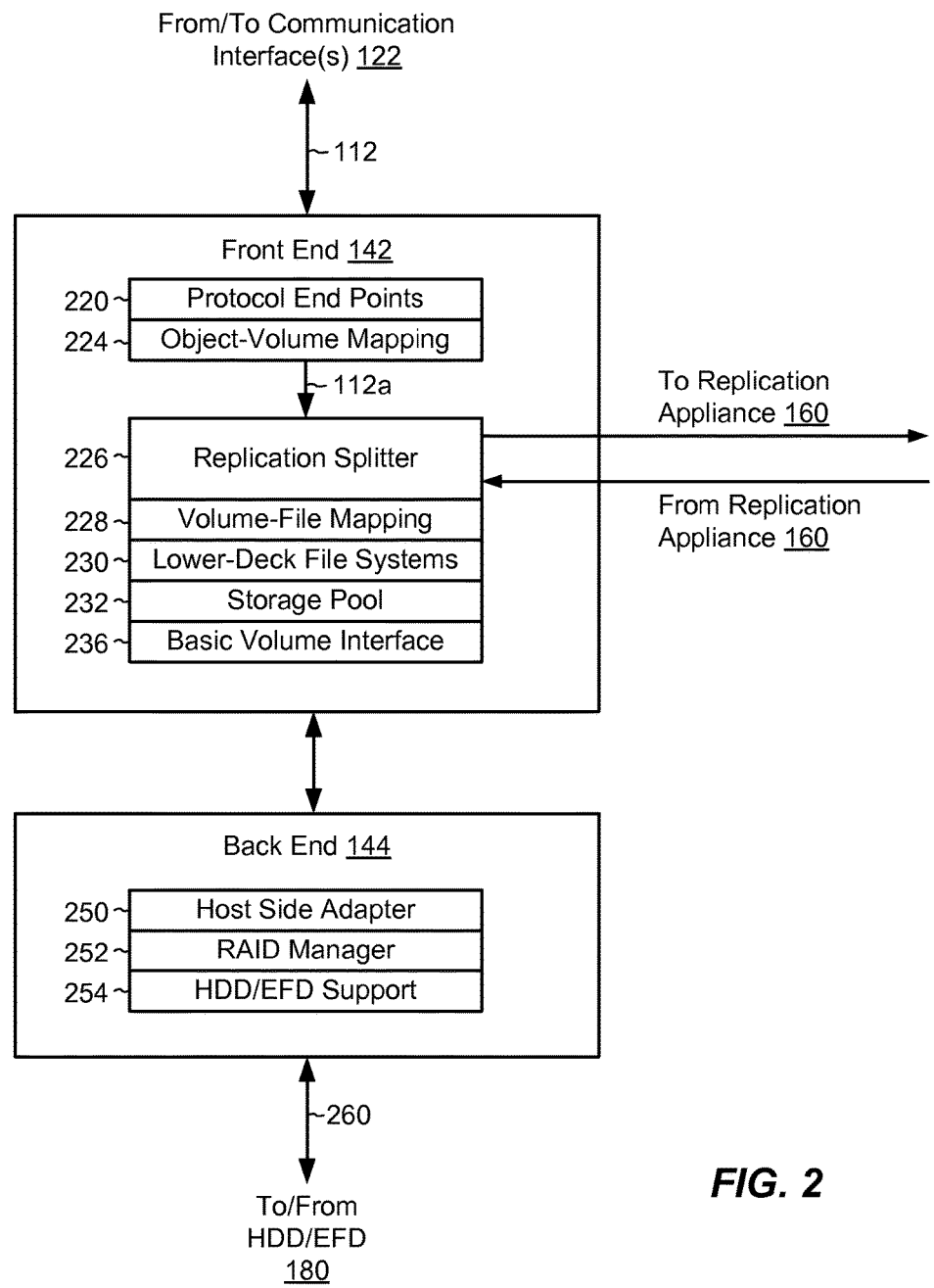
FIG. 2 is a block diagram showing an example IO stack of the storage processor of FIG. 1.

FIG. 2 shows the front end 142 and back end 144 of the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), for ease of understanding, the different components of the IO stack 140 are described herein from the bottom up.

At the back end 144, the hard disk drive/electronic flash drive support 254 includes drivers that perform the actual reading from and writing to the storage 180. The RAID manager 252 accesses particular storage units (slices) written or read using RAID protocols. The host side adapter 250 provides an interface to the front end 142, for instances in which the front end 142 and back end 144 are run on different machines. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different hardware, The basic volume interface 236 may also be disabled in the arrangement shown in FIG. 1.

The storage pool 232 organizes elements of the storage 180 in the form of slices. A "slice" is an increment of storage space, such as 256 MB or 1 GB in size, which is derived from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by a storage pool 232 and represent both block-based objects and file-based objects internally in the form of files (container files). The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances includes other files that store snaps of the file that stores the data object. Some implementations may involve the storage of other files. Each lower-deck file system 230 has an inode table. The inode table provides a different inode for each file stored in the respective lower-deck file system. The inode table may also store properties of the file(s), such as their ownership and block locations at which the file's/files' data are stored.

The volume-file mapping 228 maps each file representing a data object to a respective volume, which is accessible using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets in the volume, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228. The replication splitter 226 is configurable by the replication manager 162 on a per-data-object basis to intercept IO requests and to replicate (e.g., mirror) the data specified to be written in such requests according to data-object-specific settings. Depending on the data object to which the IO request is directed and the replication settings defined for that object, the replication splitter 226 may allow IO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication manager 162 can configure the replications splitter 226 in a variety of ways for responding to different types of IO requests. For example, replication manager 162 can configure the replication splitter 226 to operate in a pass-through mode for control IOs and for IO requests specifying data reads. In some situations, the replication manager 162 can configure the replication splitter 226 to intercept reads as well as writes. In any such situations, the replication manager 162 can configure the replication splitter 226 on a per-data-object basis.

The object-volume mapping layer 224 maps internal volumes to respective data objects, such as LUNs, host file systems, and vVOLs. Mapping underlying volumes to host-accessible LUNs may simply involve a remapping operation from a format compatible with the internal volume to a format compatible with the LUN. In some examples, no remapping is needed. Mapping internal volumes to host file systems, however, may be accomplished in part by leveraging from the fact that file systems are customarily built upon volumes, such that an underlying volume is part of the structure of a host file system. Host file systems, also called "upper-deck file systems," are thus built upon the internal volumes presented by the volume-file mapping 228 to provide hosts with access to files and directories. Mapping of vVOLs can be achieved in similar ways. For block-based vVOLs, the object-volume mapping layer 224 may perform mapping substantially as it does for LUNs. File-based vVOLs may be mapped, for example, by converting host-specified offsets into vVOL files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based vVOLs) using Fiber Channel or iSCSI and may expose file-based objects (e.g., host file systems and file-based vVOLs) using NFS, CIFS, or SMB 3.0, for example.

In operation, the IO stack 140 receives an IO request 112 specifying data to be written to a particular data object. The object-volume mapping 224 maps the IO request 112 to a block-based request 112a directed to an internal volume. The replication splitter 226 may intercept the block-based request 112a and send the block-based request 112a to the replication appliance 160 (or may pass through the IO request, depending on settings established by the replication manager 162 for the data object). Assuming the replication splitter 226 intercepts the block-based request 112a, the replication appliance 160 coordinates with other components to replicate the data specified in the block-based request 112a at a second site and provides the replication splitter 226 with an acknowledgement. When the replication splitter 226 receives the acknowledgement, the replication splitter 226 allows the block-based request 112a to continue propagating down the IO stack 140. The volume-file mapping 228 maps the block-based request 112a to one that is directed to a particular file of a lower-deck file system, and the back end 144 and storage 180 process the IO request by writing the specified data to actual media. In this manner, the IO stack 140 supports both local storage of the data specified in the IO request 112 and replication at a second site.

Figure 3:
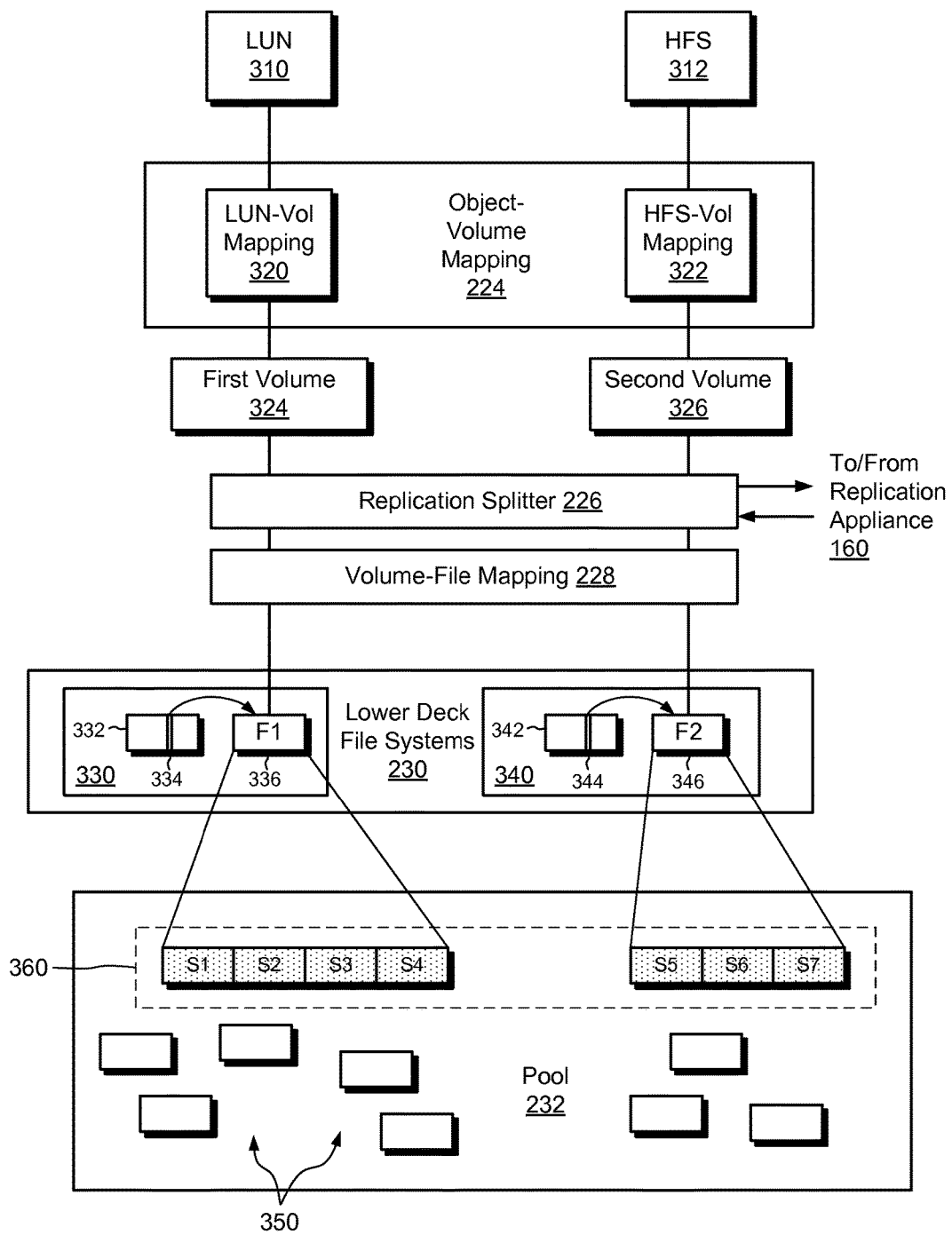
FIG. 3 is a block diagram showing example features of the IO stack of FIG. 2 in additional detail.

FIG. 3 shows portions of the front end 142 in additional detail. Here, data objects include a LUN 310 and an HFS (host file system) 312. The object-volume mapping 224 includes a LUN-to-Volume mapping 320 and an HFS-to-Volume mapping 322. Using the approach described above, the LUN-to-Volume mapping 320 maps the LUN 310 to a first volume 324, and the HFS-to-Volume mapping 322 maps the HFS 312 to a second volume 326. The replication splitter 226 may intercept IOs in accordance with settings established by the replication manager 262 (as described above). The Volume-to-File mapping 228 maps the first and second internal volumes 324 and 328 to respective files 336 (F1) and 346 (F2) in respective lower-deck files systems 330 and 340. Through the various mappings, any set of blocks of the LUN 310 specified in an IO request 112 is mapped to a corresponding set of blocks within the first file 336. Similarly, any file or directory of the HFS 312 specified in an IO request 112 is mapped to a corresponding set of blocks within the second file 346.

The lower-deck file system 330 includes an inode table 332, and the lower-deck file system 340 includes an inode table 342. An inode 334 provides file-specific information about the first file 336, and an inode 344 provides file-specific information about the second file 346. The information stored in each inode includes location information (e.g., block locations) where data of the respective file are stored.

Although a single file is shown for each of the lower-deck file systems 330 and 340, it is understood that each of the lower-deck file systems 330 and 340 may include any number of files, with each having its own entry in the respective inode table. In one example, each lower-deck file system stores not only the file F1 or F2, but also snaps of those files, and therefore snaps of the data objects the files store. For example, the first lower-deck file system 330 stores the first file 336 representing the LUN 310 along with a different file for each snap of the LUN 310. Similarly, the second lower-deck file system 340 stores the second file 346 representing the HFS 312 along with a different file for every snap of the HFS 312.

As shown, the storage pool 232 allocates slices 360 for providing storage for the first file 336 and the second file 346. In the example shown, slices S1 through S4 store the data of the first file 336, and slices S5 through S7 store the data of the second file 346. The data that make up the LUN 310 are thus stored in the slices S1 through S4, whereas the data that make up the HFS 312 are stored in the slices S5 through S7.

II) Synchronous Replication of Block-Based and File-Based Objects:

Example techniques for performing synchronous replication on both block-based objects and file-based objects are now described in connection with FIGS. 4-7. As is known, "synchronous" replication refers to replication performed in band with IO requests 112 as the IO requests are processed. With synchronous replication, IO requests designating data to be written to a data object are generally persisted to a replica site on an individual basis, e.g., one-by-one, as the IO requests arrive. In contrast, "asynchronous" replication is performed out of band with individual IO requests, with replicas generated, for example, on demand, at regular intervals, and/or in response to particular events.

Figure 4:
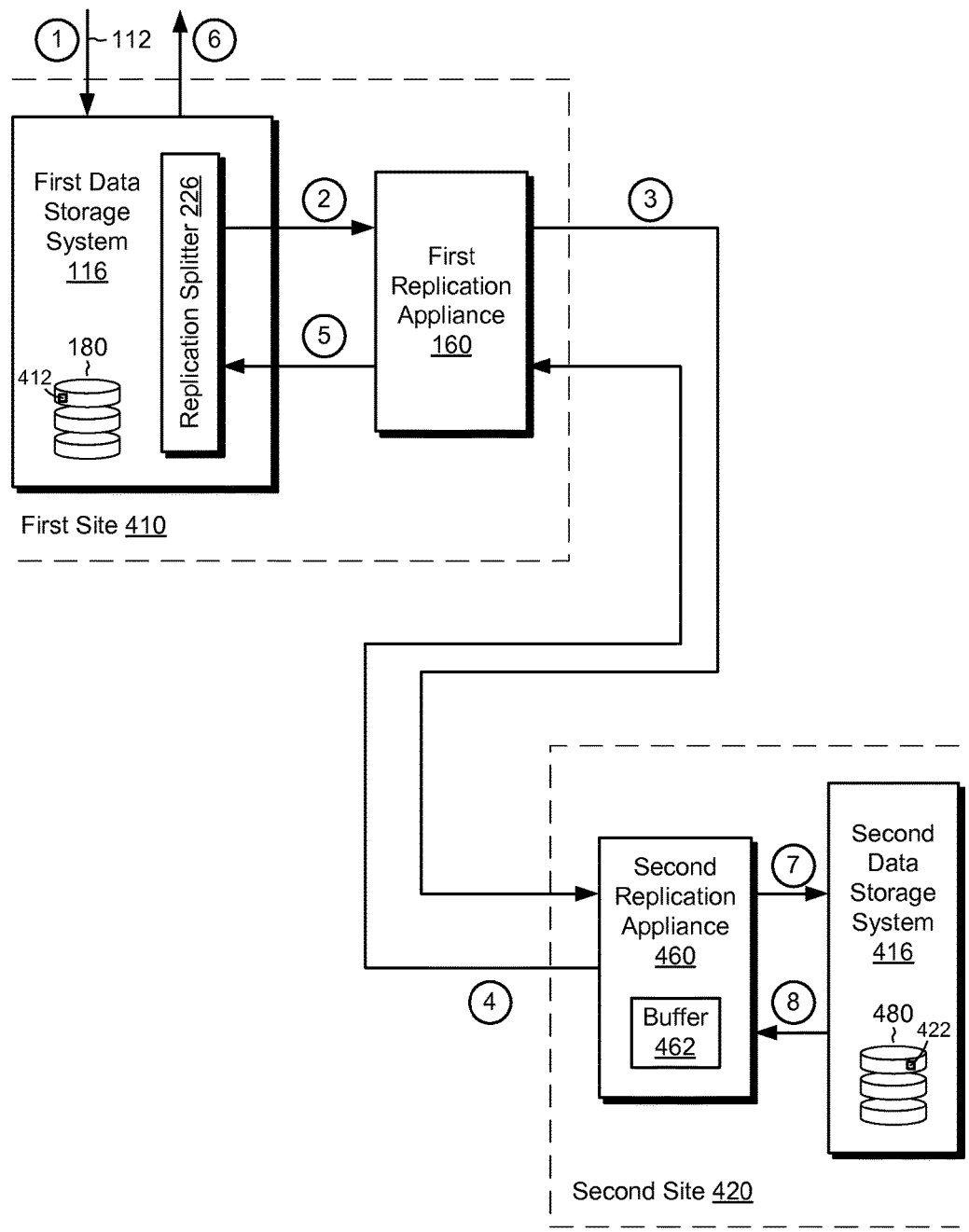
FIG. 4 is a block diagram showing synchronous replication between a first data storage system at a first site and a second data storage system at a second site.

FIG. 4 shows an example arrangement for performing synchronous replication of a data object 412 stored on a first data storage system 116 (FIG. 1) to a second data storage system 416. Here, the first data storage system 116 is located at a first site 410 (i.e., at a "source") and the second data storage system 416 is located at a second site 420 (i.e., at a "destination"). In an example, the first site 410 and the second site 420 are located at different geographical locations, such as in different buildings of a city or campus. The second data storage system 416 includes persistent storage 480 (e.g., disk drives, flash drives, and the like) and is operatively connected to a second replication appliance 460. The second replication appliance 460 includes a buffer 462, which may be implemented in non-volatile memory (e.g., on disk or flash). In some examples, the buffer 462 is implemented in high-speed non-volatile memory within the storage 480, but separate and apart from any replica storage. Further, the second replication appliance 460 may be included entirely within the second data storage 416. Although the components at the first site 410 and the second site 420 are shown to be different, they may alternatively be the same, so as to provide symmetrical behavior, with each site acting as a replica site for data objects stored on the other. As shown in this example, however, the first site 410 acts to receive and process IO requests 112 from hosts, whereas the second site 420 acts to provide a replica 422 of the data object 412.

The encircled numbers in FIG. 4 identify an example sequence of events. At (1), the first data storage system 116 receives an IO request 112 specifying data to be written in the storage 180 for a particular data object 412 (e.g., a LUN, a host file system, a vVOL, etc.). The IO request 112 propagates down the IO stack 140 (FIG. 2) and encounters the replication splitter 226. The replication splitter 226 intercepts the IO request and temporarily prevents the IO request from propagating further down the IO stack 140 (FIG. 2). At (2), the replication splitter 226 sends the IO request (e.g., a version thereof) to the first replication appliance 160. At (3), the first replication appliance 160 forwards the IO request to the second replication appliance 460, which stores the data specified in the IO request in the buffer 462. At (4), the second replication appliance 460 acknowledges safe storage of the data specified in the IO request to the first replication appliance 160 (e.g., that the data specified in the IO request are persisted in the buffer 462). At (5), the first replication appliance 160 in turn acknowledges receipt to the replication splitter 226. Only when the replication splitter 226 receives the acknowledgement does the replication splitter 226 allow the IO request to continue propagating down the IO stack 140 (FIG. 2) to complete the write operation to the storage 180. At (6), the first data storage system 116 acknowledges completion of the IO request 112 back to the originating host. Asynchronously with the IO request, the second replication appliance 460 may de-stage the buffer 462 to the replica 422 of the data object maintained in the storage 480. For example, at (7), the data specified in the IO request are transferred from the buffer 462 to the storage 480, and at (8), the second data storage system acknowledges completion.

Many variants are contemplated. For example, the buffer 462 may be realized using volatile memory (e.g., RAM). In such cases, the second replication appliance 460 may wait to acknowledge a write to the first replication appliance 160 until it receives confirmation that the data specified in the IO request has been persisted in the replica 422 for the data object 412 in the storage 480.

As described, the first data storage system 116 conducts synchronous replication with the second data storage system 416 on a per-data-object basis and in accordance with object-specific settings. The replication manager 162 establishes these settings and orchestrates replication activities, recovery activities, and failover activities. In an example, the GUI application 164 provides an entry point to the replication manger 162 to allow users to specify object-specific settings. In some examples, the GUI application 164 is configured to accept user input for managing a wide range of operations of the data storage system 116, including configuring pools, configuring block-based objects, and configuring file-based objects, as well as for managing replication. Although particular aspects of the GUI application 164 are described herein in relation to replication, it is understood that the GUI application 164 may have a much larger scope than for controlling replication alone. For example, in some implementations, the GUI application 164 is a modified form of the Unisphere integrated management tool, available from EMC Corporation of Hopkinton, Mass. Providing the GUI application 164 within Unisphere simplifies the user experience by avoiding for the user to operate a separate GUI for controlling replication.

Figure 5:
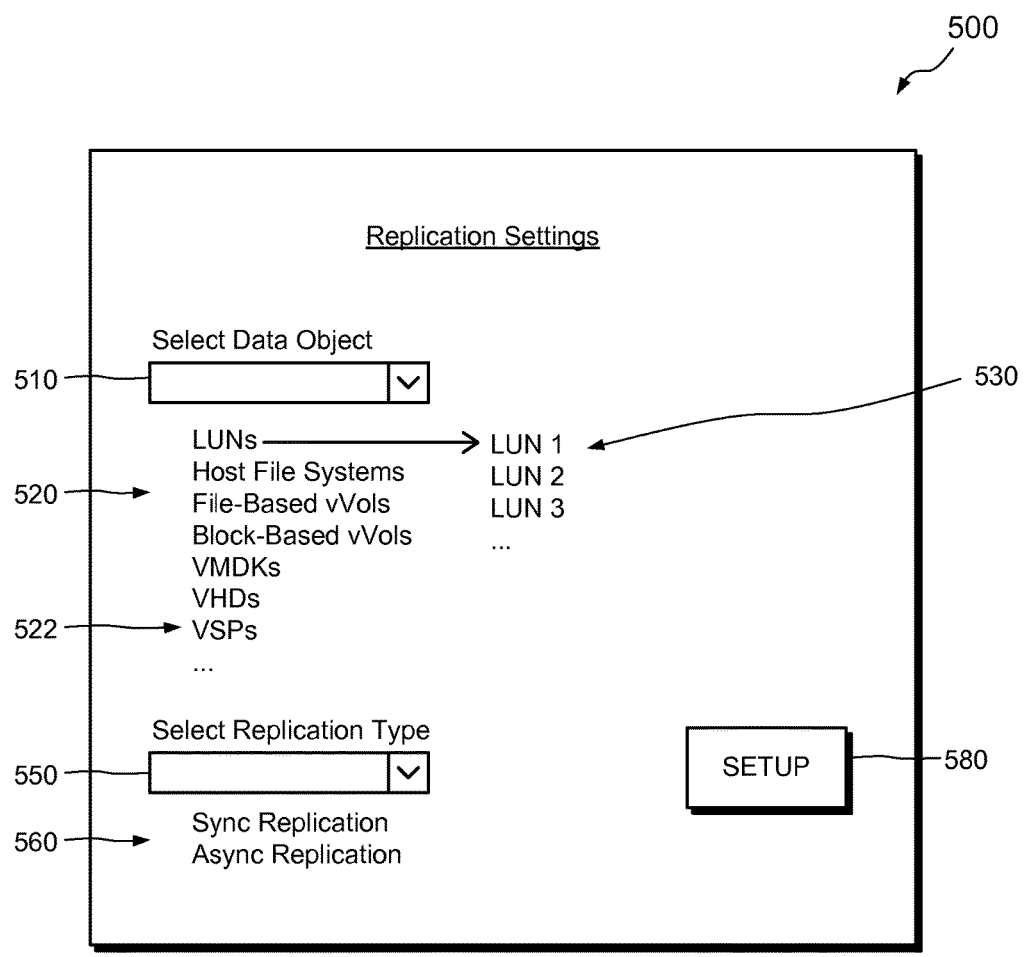
FIG. 5 is an example screen generated by a graphical user interface (GUI) application for establishing replication settings of data objects on a per-user-object basis.

FIG. 5 shows an example screen shot 500 of the GUI application 164 that allows users to specify object-specific replication settings. It is understood that the screen 500 is shown in simplified form and is intended to be merely illustrative. Here, the screen 500 includes a control 510 for selecting a desired data object. In an example, a user clicks the control 510 to reveal a list of available objects. The control 510 may organize the data objects in multiple levels, e.g., in a first level 520 that lists different types of data object (e.g., LUNs, Host File Systems, etc.) and in a second level 530 that lists particular data objects of a type the user selects from the first level 520 (e.g., LUN 1, LUN 2, etc.). In an example, the GUI application 164 queries the configuration database 170 and/or other databases to obtain lists of available data objects and stores such lists in connection with the control 510. A user may click the control 510 to display a list of object types objects in the first level 520. The user may then and click a desired type from the list displayed at first level 520 to cause the control 510 to display a list of data objects of the selected type in the second level 530. A different list is displayed in the second level 530 for each selection in the first level 520. The user may then click a particular listed data object to establish configuration settings for that object. For example, the user may click "LUNs" from the first level 520 and then click "LUN 2" from the second level 530 to configure settings for LUN 2.

The user may next click a control 550 to select a particular data protection operation. List 560 appears when the user clicks the control 550 and displays example options. These include, for example, "Synch Replication" for synchronous replication and "Async Replication" for asynchronous replication. The user may the click a button 580 ("SETUP") to configure settings for the selected replication type (selected via control 550) on the selected data object (selected via control 510).

Figure 6:
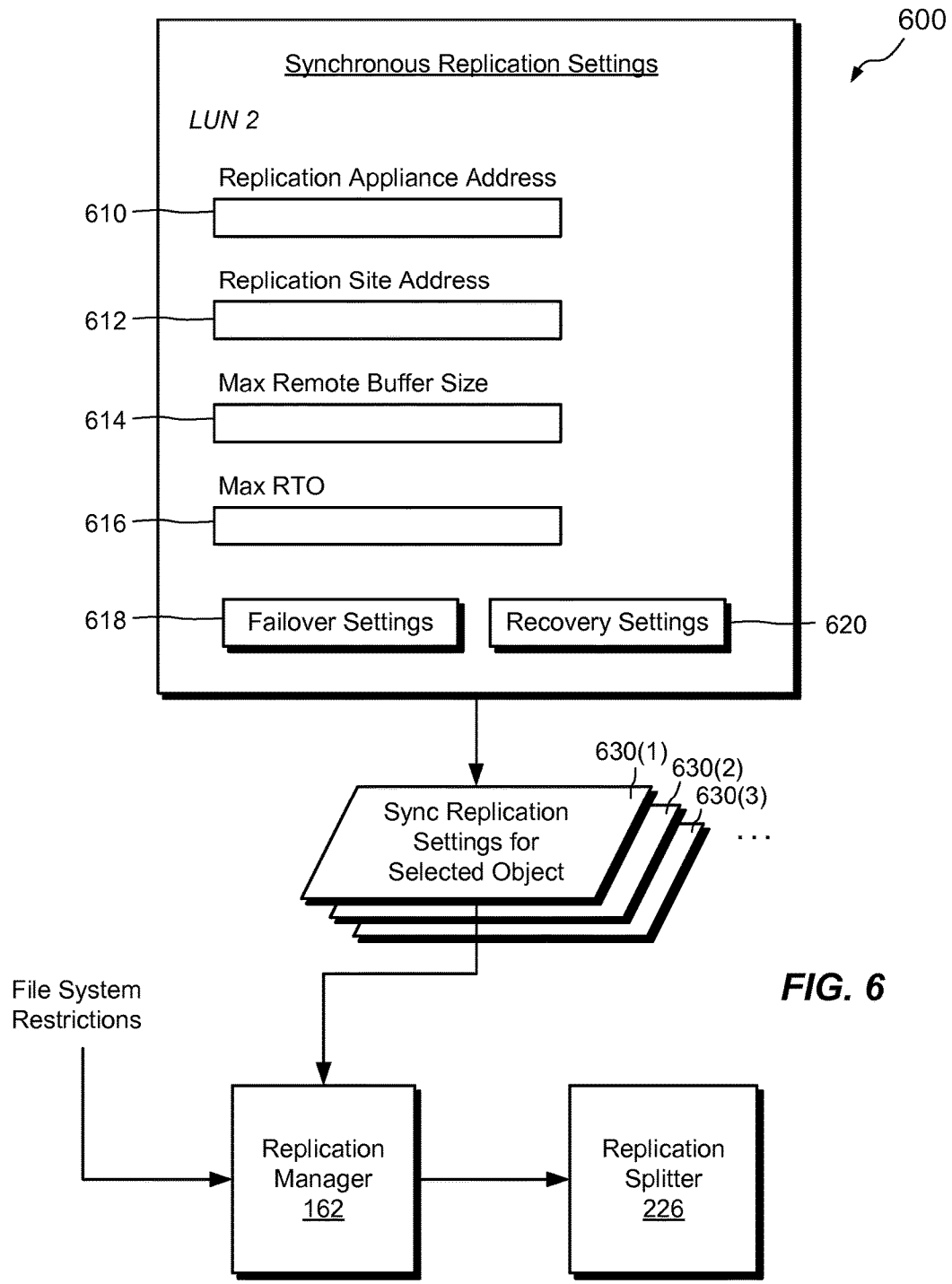
FIG. 6 is another example screen generated by the GUI application for establishing synchronous replication settings on a per-data-object basis.

FIG. 6 shows an example screen 600 of the GUI application 164, which the GUI application displays, for example, when the user selects "LUN 2" with the control 510 and selects "Sync Replication" from the control 550 (FIG. 5). The GUI application 164 thus accepts user input, via the screen 600, for establishing synchronous replication settings specific to LUN 2. It is understood that the screen 600 can be configured to accept settings for different data objects when the user selects them, e.g., using the control 510. Also, different screens may be displayed when the user selects different replication types (e.g., using the control 550).

The screen 600 accepts a number of different replication settings. These include, for example, the following settings:

Replication Appliance Address (610): The address (e.g., SCSI or IP address) of the replication appliance 160. Different replication appliance addresses may be provided for different data objects. For example, multiple replication appliances (like the appliance 160) may be connected to the data storage system 116 over a SAN (storage area network) or other network. Assigning different replication appliance addresses to different data objects causes different replication appliances to be used for replicating the respective objects. In some examples, replication appliances are arranged into clusters. In such cases, the Replication Appliance Address 610 may designate a cluster address. Where a cluster address is specified, the replication splitter 226 may select individual appliance units within a cluster based on load, for example.

Replication Site Address (612): The address (e.g., IP address) of a data storage system or a replication appliance at a second site. In the example of FIG. 4, the replication site address can be the address of the second replication appliance 460 or the address of an SP running on the second data storage system 416.

Max Remote Buffer Size (614): The maximum amount of data that may be stored in a buffer at the second site. In the example of FIG. 4, the Max Remote Buffer Size refers to the amount of data in the buffer 462 from IO requests 112 that have not yet been committed to the replica 422 in the storage 480. By setting Max Remote Buffer Size 614 to a large value, a considerable amount of time may be required to de-stage data to the replica 422 in the storage 480 to bring the replica 422 up to date with the data object at the first site 410. By setting Max Remote Buffer Size 614 to a small value, little time is needed to commit pending data, such that the replica 422 is kept nearly up to date with the original object at all times.

Max RTO (616): The maximum amount of time (Recovery Time Objective) that the data object may remain unavailable to hosts after the data object becomes unavailable at its source. In the example of FIG. 4, the Max RTO 616 is the maximum amount of time that is allowed to pass after a failure at the source before the replica of the data object in the storage 480 is brought up to date with the source and made available to hosts. In general, the more uncommitted IO requests that are pending in the buffer 462, the greater amount of time required to activate the replica. Therefore, an effective way to reduce RTO is set the Max Remote Buffer Size 614 to a small value. As Max RTO 616 is closely related to Max Remote Buffer Size 614, some implementations may not offer the option to control both.

The example settings 610, 612, 614, and 616 are shown for illustrative purposes. It is understood, however, that the particular settings shown are not necessarily required nor are they intended to represent all possible settings that may be desired.

The screen 600 is further seen to include buttons 618 and 620, for establishing failover settings and recovery settings, respectively, for the selected data object. In an example, clicking the button 618 brings up a failover screen (not shown) for accepting user input to establish failover settings for the data object. Failover settings may include, for example, an address of a failover site, a maximum allowable amount of data loss (RPO), a maximum RTO, as above, as well as other settings. Clicking the button 620 may bring up a recovery screen (not shown) for accepting user input to establish recovery settings for the selected data object. Recovery settings may include, for example, a recovery destination (e.g., a location to which a replica is to be restored), as well as maximum RPO and RTO settings to be applied for recovery operations.

Although the screens 500 and 600 have been shown and described in connection with a particular data object (LUN 2), it should be understood that similar screens may be presented for other LUNs, and for other types of data objects, with the screens 500 and 600 accepting user settings for any currently selected object. Thus, the GUI application 164 may be used for establishing replication, failover, and recovery settings on a per-data-object basis, with each data object having its own respective settings.

As further shown in FIG. 6, the GUI application 164 may generate output providing sync replication settings for the selected object. For example, the GUI application 164 may gather all user-established settings specified in the screens 500 and 600 (as well as any settings gathered from the failover screen and/or recovery screen) and provide such object-specific settings in an output file 630(1). Additional output files (e.g., 630(2), 630(3), . . . ) may be provided for other data objects, e.g., one per data object. It should be readily apparent, however, that object-specific settings may be stored in any suitable way, such as in different files (as shown), as a single file (e.g., an XML file), as records in a database, or in any number of other ways. In any case, the GUI application 164 sends the object-specific settings to the replication manager 162, which receives the settings and applies them to establish replication sessions with replica sites for each data object in accordance with its respective settings. In this manner, the GUI application 164 may act as a single entry point to the replication manager 162 for controlling replication on a per-object basis.

The replication manager 162 may orchestrate any number of replication sessions at any given time, with each replication session operating to replicate a respective data object. For each replication session, the replication manager 162 communicates with a respective replica site (e.g., with a counterpart replication manager at the replica site) and coordinates replication activities in accordance with the object-specific settings. In the event of a failure at the data storage system 116 that renders a data object or the entire data storage system 116 unavailable, the replication manager at the replica site can orchestrate failover and/or recovery operations in accordance with the same settings established in the replication manager 162 on the data storage system 116.

As further shown in FIG. 6, the replication manager 162 may also receive information describing file system restrictions. These restrictions may apply to upper-deck file systems. They may also apply to lower-deck file systems, i.e., to the file systems in which the file realizations of the data objects themselves are stored (FIGS. 2 and 3). Any of such file systems may operate subject to restrictions, such as restrictions prohibiting deletion prior to a certain date. These restrictions may include File Level Retention for compliance (FLR-C) and/or File Level Retention for enterprises (FLR-E). When restriction information is provided for a particular data object, the replication manager 162 receives the information and includes it with the object-specific settings for the data object. When replication is conducted on the object, the replica site obtains the restriction information and applies the identified restrictions to the replica. The replica is thus made subject to the same restrictions as the original object.

Although the GUI application 164 accepts user input for establishing various replication settings for a data object, the replication manager 162 may, in some examples, generate synchronous replication settings for a data object on its own, automatically, and without user input, and initiate a replication session for the data object with a destination object in accordance with the automatically generated settings. Thus, replication may proceed on a data object even if a user does nothing to establish replication settings.

Once the replication manager 162 receives object-specific replication settings for a particular data object, the replication manager 162 configures the replication splitter 226 (FIGS. 2-4) to operate in accordance with the settings for the respective object. In an example, the replication manager 162 identifies a particular internal volume (FIGS. 2 and 3)

in the IO stack 140 that the object-volume mapping 224 maps to the data object. The replication manager 162 then activates the replication splitter 226 on the identified volume. Then, whenever the replication splitter 226 receives an IO request specifying data to be written to the internal volume mapped to the data object, the replication splitter 226 performs replication activities in accordance with the settings for the data object. These include, for example, sending the IO request to the replication appliance 160 designated in the settings for the object, configuring the buffer (e.g., 462), and so forth. Because the replication splitter 226 recognizes volumes and because the replication manager 262 can identify the internal volume for each data object, the replication splitter 226 and the replication manager 260 can together manage replication on a per-data-object basis.

This section has presented a technique that performs synchronous replication on both block-based objects and file-based objects. The technique may be used in connection with a data storage system 116 that internally stores data objects (e.g., LUNs, file systems, block-based vVOLs, file-based vVOLs, etc.) in the form of respective files (e.g., files 336, 346), such that each file provides a realization of a data object. The data storage system 116 maps each such file to a respective logical volume (e.g., 324, 326), and each logical volume provides a block-based interface. As the data storage system receives IO requests 112 (e.g., from hosts 110(1) to 110(N)) specifying data to be written to a data object, the data storage system 116 renders the IO requests as block-based requests, regardless of whether the IO requests are themselves block-based or file-based. A block-based replication splitter intercepts the block-based requests directed to the logical volumes and performs continuous, synchronous replication on the block-based requests, thereby achieving synchronous replication of both block-based objects and file-based objects in a single, unified architecture. The technique typically results in a reduced need for multiple, diverse replication solutions, and thus fewer items that must be purchased, learned, and maintained.

III) Synchronous and Asynchronous Replication of Block-Based and File-Based Objects:

Example techniques for performing asynchronous replication for both block-based objects and file-based objects are now described in connection with FIGS. 7-11. It is understood that the asynchronous replication techniques described in this section may be used independently of the synchronous techniques described in Section II above or may be used alongside such synchronous replication techniques. For example, the replication manager 162 may establish settings for both synchronous and asynchronous replication for any given data object (LUN, file system, vVOL, etc.) and may conduct a synchronous replication session and an asynchronous replication session on the same data object or on different objects at the same time or at different times. For example, at the same time that synchronous replication proceeds on a data object in band with IO requests directed to the data object, asynchronous replication may also proceed, out of band with IO requests but on some timing schedule (hourly, daily, etc.) or in response to various events. It is understood that the asynchronous replication techniques described herein may be conducted in the same or a similar environment to that disclosed in Section I, i.e., in the same environment where the above-disclosed synchronous replication technique is performed.

As it does with synchronous replication, the replication manager 162 establishes settings for performing asynchronous replication, orchestrates asynchronous replication sessions with replica sites, and orchestrates recovery and/or failover operations, all on a per-data-object basis. The same GUI application 164 accepts user input for configuring both synchronous and asynchronous settings and thus provides an entry point to the replication manager 162 with respect to both synchronous and asynchronous replication.

Figure 7:
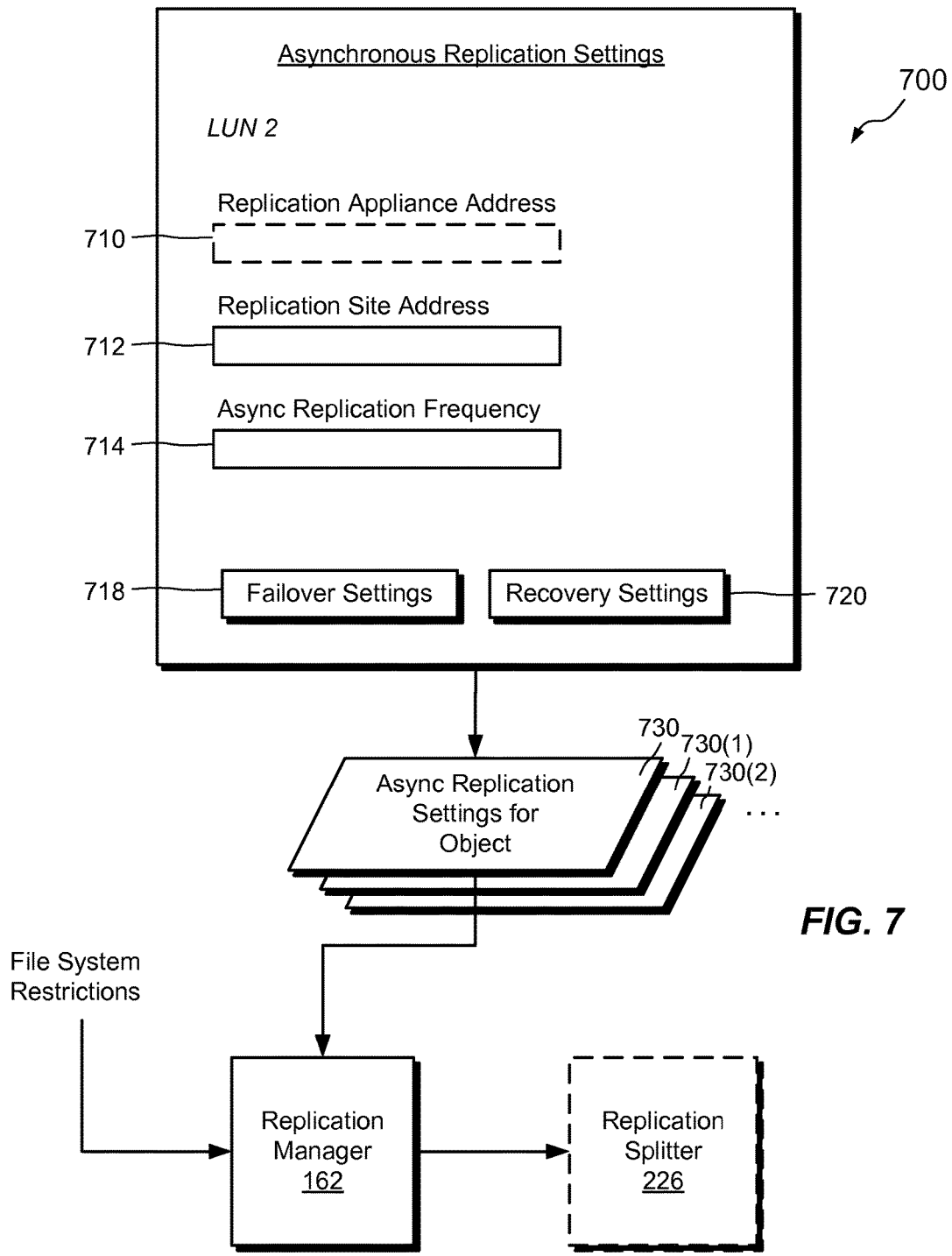
FIG. 7 is another example screen generated by the GUI application for establishing asynchronous replication settings on a per-user-object basis.

FIG. 7 shows an example screen 700 generated by the GUI application 164 for configuring asynchronous replication settings for data objects on a per-data-object basis. The GUI application 164 generates the screen 700, for example, when the user selects "LUN 2" with the control 510 and "Async Replication" with the control 550 (FIG. 5). The screen 700 thus collects user input for establishing asynchronous replication settings specific to LUN 2. The screen 700 is shown in simplified form and is intended to be merely illustrative.

Screen 700 accepts user input for a variety of settings, some of which may be similar to those presented in the screen 600. For example, the screen 700 accepts a setting 712 for Replication Site Address, which is similar to the setting 612 but specifies a site address for asynchronous replication. This site address may be the same as that specified for synchronous replication or it may be different. The screen 700 also presents buttons 718 and 720, which perform similar functions to those performed by the buttons 618 and 620, i.e., to establish failover settings and recovery settings, respectively. In some implementations, the screen 700 also accepts a setting 710, similar to the setting 610, for a Replication Appliance Address, which may be the same or different from any Replication Appliance Address 610 specified for synchronous replication. Although replication appliances have been described above in connection with synchronous replication, certain embodiments hereof also employ replication appliances for performing asynchronous replication. The screen 700 may also accept a setting 714 that allows a user to provide a desired Async Replication Frequency 714, i.e., how often to perform asynchronous replication operations. Example entries for setting 714 may include "Hourly," "Daily," and so on. The screen 700 may accept additional asynchronous settings (not shown), such as for designating events that trigger asynchronous replication activities.

Although the screen 700 has been shown and described in connection with a particular data object (LUN 2), it should be understood that similar screens may be presented for other LUNs, and for other types of data objects, with the screen accepting user settings for any currently selected object. Also, the example settings 710, 712, and 714 are shown for illustrative purposes. It is understood that the particular settings shown are not necessarily required nor are they intended to represent all possible settings that may be desired.

The screen 700 generates output that provides asynchronous replication settings for the selected object. For example, the GUI application 164 may gather all user-established settings specified in the screen 700 (as well as any settings gathered from the failover screen and/or recovery screen) and provide such object-specific settings in an output file 730(1). Additional output files (e.g., 730(2), 730(3), . . . ) may be provided for additional data objects, e.g., one per data object. However, object-specific settings may be stored in any suitable way, such as in different files (as shown), as a single file (e.g., an XML file), as records in a database, or in any number of other ways. Also, such records or files may be combined with those (e.g., 630(1), 630(2), . . . )) for storing synchronous replication settings in a single location or set of locations.

The GUI application 164 sends the object-specific settings to the replication manager 162, which receives the settings and may apply them to establish asynchronous replication sessions with specified replica sites for each data object in accordance with its respective settings.

The replication manager 162 may orchestrate any number of asynchronous replication sessions at any given time, with each asynchronous replication session operating to replicate a respective data object. Also, the replication manager 162 may operate multiple asynchronous replication sessions on any data object simultaneously (e.g., for replicating the same object to different sites). For each asynchronous replication session, the replication manager 162 communicates with a respective replica site (e.g., with a counterpart replication manager at the replica site) and coordinates replication activities in accordance with the object-specific settings. In the event of a failure at the data storage system 116 that renders a data object or the entire data storage system 116 unavailable, the replication manager at the replica site can orchestrate failover and/or recovery operations in accordance with the same settings established in the replication manager 162 on the data storage system 116.

The replication manager 162 may apply the information describing file system restrictions in a manner similar to that described above for synchronous replication. When the replication manager 162 conducts asynchronous replication on a particular data object stored in a file system to which file system restrictions apply, the replication manager 162 communicates the restriction information to the replica site, e.g., in the async replication settings for the object. The replica site then applies the identified restrictions to the replica. The replica is thus made to be subject to the same restrictions as the original object. Thus, restrictions are passed from the source to the replica for asynchronous replication in a manner similar to that described above for synchronous replication.

In a manner similar to that described above for synchronous replication, the replication manager 162 may, in some examples, generate asynchronous replication settings for a data object on its own, automatically, and without user input, and initiate an asynchronous replication session for the data object with a destination object in accordance with the automatically generated settings. Thus, asynchronous replication may proceed on a data object even if a user does nothing to establish asynchronous replication settings.

The data storage system 116 may employ various techniques for effecting asynchronous replication. One technique operates by consuming snaps of the underlying files that realize the data objects. Another technique employs the replication splitter 226.

Figure 8:
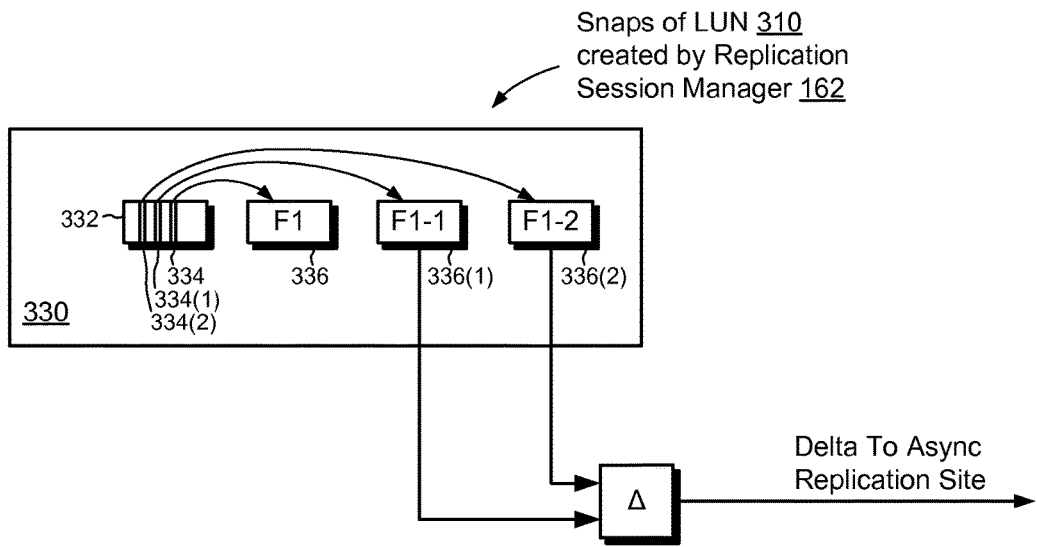
FIG. 8 is a block diagram showing an example technique for asynchronously replicating a LUN by consuming snaps.

FIG. 8 shows an example technique for effecting asynchronous replication of a LUN using snaps. Here, the replication manager 162 has snapped the file 336 that realizes the LUN 310 (F1 from FIG. 3) to create a first snap 336(1) (F1-1) of the LUN 310 and a second snap 336(2) (F1-2) of the LUN 310. Like the LUN 310 itself, the snaps 336(1) and 336(2) are stored as files in the lower-deck file system 330. Also, in the same way that the file 336 has an inode 334 in the inode table 332 of the lower-deck file system 330, so too do the files 336(1) and 336(2) have inodes 334(1) and 334(2), respectively in the inode table 332.

On some predetermined schedule and/or in response to events as defined in the data-object-specific settings for the LUN 310, the replication manager 162 creates new snaps of the LUN 310. Each time a new snap is taken, a new file 336($i$) is created and a new inode 334($i$) is allocated from the inode table 332. In an example, all snaps of the LUN 310 are stored in the lower-deck file system 330.

When the new snap is created, the replication manager 162 computes a difference between the two most recent snaps (here, 336(1) and 336(2)) and sends the difference to an asynchronous replication site, again as specified in the data-object-specific settings for the LUN 310. More generally, each time the replication manager 162 creates a new snap 336($i$), the replication manager 162 computes a new difference based on the most recent snap 336($i$) and the immediately preceding snap 336($i$–1) and sends the new difference to the asynchronous replication site. A replication manager running on the replication site then applies the difference to the replica to update the replica with the contents of the difference, i.e., with the recent changes.

The asynchronous replication technique shown in FIG. 8 is based on snapping files, regardless of the content of those files. Thus, although FIG. 8 shows an example of asynchronous replication of the LUN 310, it is understood that the same technique can be generalized to other types of data objects that are similarly represented as files in lower-deck file systems. Thus, the asynchronous replication technique of FIG. 8 can be used for asynchronously replicating not only LUNs, but also file systems, block-based vVOLs, file-based vVOLs, and other data objects realized as files in a lower-deck file system.

Figure 9:
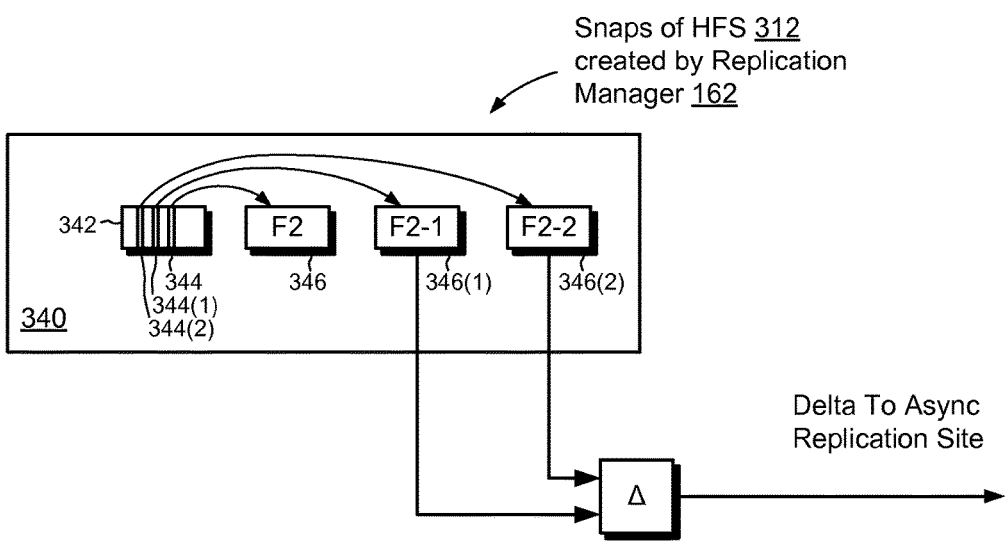
FIG. 9 is a block diagram showing an example technique for asynchronously replicating a host file system by consuming snaps.

For example, FIG. 9 shows an example technique for effecting asynchronous replication of an HFS using snaps. Here, the replication manager 162 has snapped the file 346 that realizes the HFS 312 (F2 from FIG. 3) to create a first snap 346(1) (F2-1) of the HFS 312 and a second snap 346(2) (F2-2) of the HFS 312. Like the HFS 312 itself, the snaps 346(1) and 346(2) are stored as files in the lower-deck file system 340. Also, in the same way that the file 346 has an inode 344 in the inode table 342 of the lower-deck file system 340, so too do the files 346(1) and 346(2) have inodes 344(1) and 344(2), respectively in the inode table 342.

On some predetermined schedule and/or in response to events as defined in the data-object-specific settings for the HFS 312, the replication manager 162 creates new snaps of the HFS 312. Each time a new snap is taken, a new file 346($i$) is created and a new inode 344($i$) is allocated from the inode table 342. In an example, all snaps of the HFS 312 are stored in the lower-deck file system 340.

The replication manager 162 takes snaps of the HFS 312, computes a difference between snaps, and sends the difference to an asynchronous replication site, as specified in the data-object-specific settings for the HFS 312 and in a manner similar to that described for the LUN 310. The replication manager running on the replication site then applies the difference to the replica to update the replica with the contents of the difference, i.e., with the recent changes.

Figure 10:
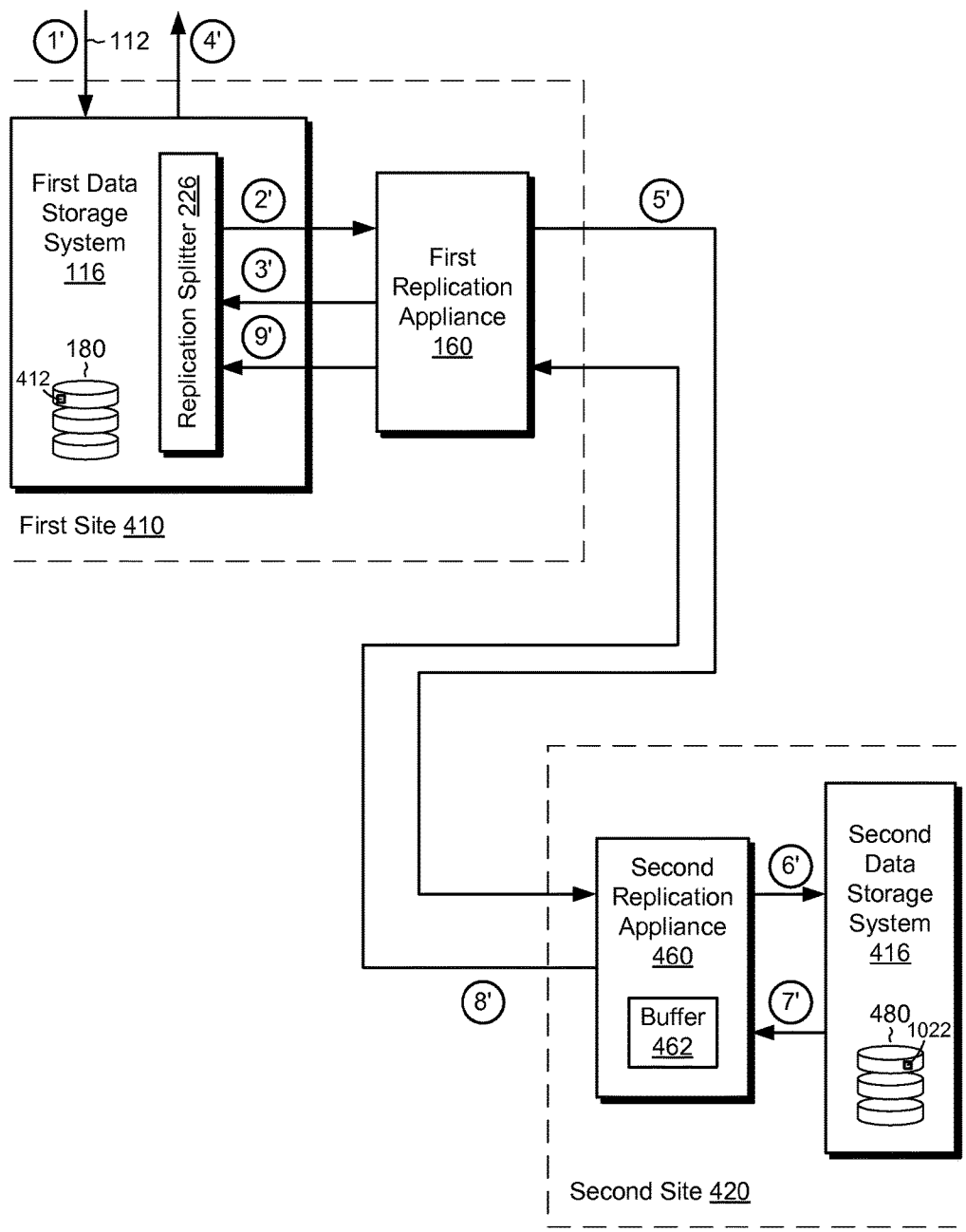
FIG. 10 is a block diagram showing an example technique for asynchronously replicating a data object using a replication splitter and replication appliance.

FIG. 10 shows an example technique for effecting asynchronous replication of a data object using the replication splitter 226. Here, the replication manager 162 configures the replication splitter 226 (FIGS. 2-4) to operate in accordance with the data-object-specific settings for performing asynchronous replication on the data object. In an example, the replication manager 162 identifies the internal volume (FIGS. 2 and 3) corresponding to the data object in the IO stack 140 and activates the replication splitter 226 on the identified volume. Then, whenever the replication splitter 226 receives an IO request specifying data to be written to the internal volume, the replication splitter 226 performs actions in accordance with the object-specific asynchronous settings for the data object. These settings may differ from those specified for synchronous replication, or in some circumstances may be the same.

In an example, the replication manager 162 directs the replication splitter 226, in accordance with the object-specific settings, to intercept IO requests specifying writes to an object and to prevent them from propagating further down the IO stack 140 (FIG. 2) until the replication splitter 226 receives acknowledgements from the first replication appliance 160 (i.e., in a manner similar to actions performed for synchronous replication). In this case, however, the first replication appliance 160 has been configured in accordance to the object-specific settings to provide acknowledgements as soon as it persists the specified data locally, e.g., in the appliance 160 itself. The first replication appliance 160 accumulates data from the replication splitter 226 and sends them to the second site 420 on a regular basis and/or upon the occurrence of specified events, i.e., in accordance with the data-object-specific settings for the object.

The encircled numbers in FIG. 10 show an example sequence for performing asynchronous replication. At (1'), the first data storage system 116 receives an IO request 112 from a host (e.g., one of 110(1-N)). The IO request 112 specifies data to be written to a particular data object, e.g., the data object 412 in the storage 180. The IO request 112 propagates down the IO stack 140 (FIG. 2) and reaches the replication splitter 226.

At (2'), the replication splitter 226, acting in accordance with the object-specific asynchronous replication settings for the object 412, mirrors the IO request 112 (i.e., a block-based form thereof) to the first replication appliance 160. The replication splitter 226 also prevents the IO request from propagating further down the IO stack 140.

At (3'), the first replication appliance 160 sends an acknowledgement to the replication splitter 226, confirming that it has received and persisted the data specified in the IO request. In response to receiving the acknowledgement, the replication splitter 226 allows the IO request to continue propagating down the IO stack 140 to effect writing of the data specified in the IO request 112 to the storage 180.

At (4'), the first data storage system 116 sends an acknowledgement back to the host that originated the IO request 112, confirming that the IO request 112 has been processed.

At (5'), which may occur at some later time after the first replication appliance 160 has accumulated data from multiple IO requests, the first replication appliance 160 sends the accumulated data to the second replication appliance 460 at the second site 420. the second replication appliance 460 stores the data in the buffer 462.

At (6'), the second replication appliance 160 sends the data to the second data storage system 416, which writes the data to a replica 1022. The replica 1022 is a replica of the object 412 generated via asynchronous replication and thus may differ from the replica 422 (FIG. 4) generated by synchronous replication.

At (7'), the data storage system 416 acknowledges to the second replication appliance 460 that the replica 1022 has been written, and at (8'), the second replication appliance 460 sends an acknowledgement back to the first replication appliance 160.

The above sequence can be repeated on a regular basis and/or in response to particular events, as specified in the data-object-specific settings, to ensure that the state of the replica 1022 does not fall far behind that of the object 412. Of course, the above sequence may also be used for asynchronously replicating other data objects.

Many variants of this asynchronous replication sequence are contemplated. According to one variant, the replication manager 162 may direct the replication splitter 226 in accordance with data-object-specific settings to mirror IO requests specifying writes to the first replication appliance 160 (or to some other appliance) without holding back the IO requests until acknowledgements are received. Thus, the first data storage system 116 may process IO requests in the usual way, with the replication splitter 226 operating to mirror IO requests but not to intercept them.

The above-described technique manages synchronous replication and asynchronous replication of both block-based objects and file-based objects via a common replication manager 162 configured from a common GUI application 164. The replication manager 162 can access different settings for different data objects (e.g., LUNs, file systems, block-based vVOLs (virtual volumes), file-based vVOLs, etc.), with replication settings maintained on a per-data-object basis. The replication manager can also orchestrate synchronous and/or asynchronous replication sessions, failover, and/or recovery, for any given data object in accordance with the particular settings established for that object.

IV) Synchronous Replication of Virtualized Storage Processors (VSPs):

Example techniques for performing synchronous replication of VSPs are now described in connection with FIGS. 11-12. It is understood that the techniques disclosed in this section are consistent with those described in Section II above for synchronous replication of data objects and may be performed in the same or a similar environment to that disclosed in Section I, i.e., in the same environment where the above-disclosed synchronous replication techniques are performed.

Figure 11:
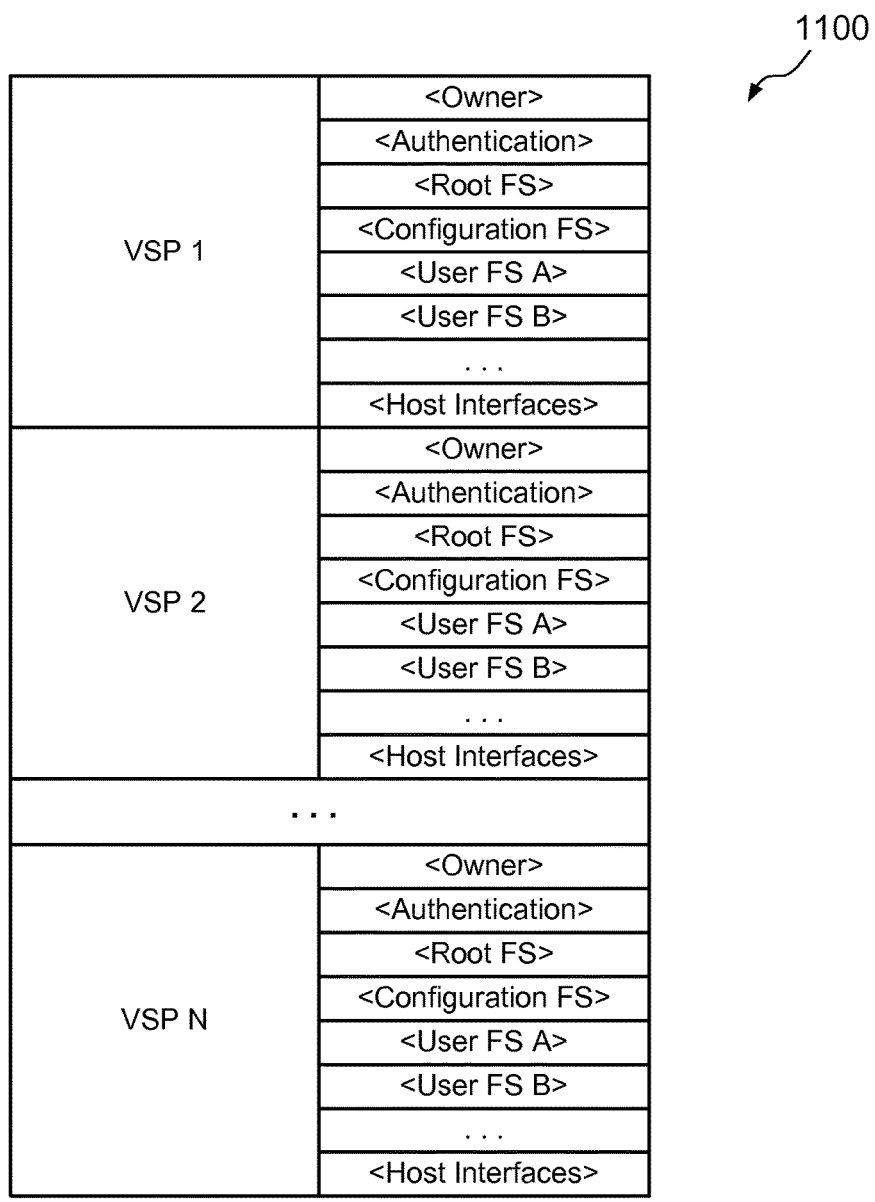
FIG. 11 is a block diagram showing example records of a configuration database that associates VSPs with data objects.

FIG. 11 shows an example set of records 1100 of the configuration database 170 (FIG. 1), which provide example definitions for VSPs 1-N. For each VSP, a record specifies an owning SP, authentication information, and identifiers of data objects (e.g., file systems) associated with the respective VSP, including identifiers of internal file systems (e.g., a root file system and a configuration file system) and various user file systems or other data objects. The record may further specify various host interfaces that define host IO protocols that the respective VSP is equipped to handle. The record for each VSP thus identifies not only data objects associated with the VSP, but also a set of interfaces and settings that form a "personality." This personality enables the VSP to interact with hosts in a manner similar to the way a physical storage processor interacts with hosts.

In operation, VSPs are instantiated on the owning SP by starting their respective host interfaces. The interfaces for each VSP can respond to host IO requests for reading and writing the data objects of the respective VSP, which are stored in the storage 180.

Referring briefly back to FIG. 5, which shows a screen 500 displayed by the GUI application 164, it is seen that one of the types of objects that a user may select for configuring replication via the control 510 are "VSPs." For example, a user may click "VSPs" at the first level 520 for control 510, in response to which the control 510 displays a list of available VSPs in the second level 530, similar to the manner in which a list of LUNs is displayed in the example of FIG. 5. The user may then click a particular VSP, e.g., "VSP 1," to select VSP 1 as the object on which to configure replication. The user may then operate the control 520 to select "Sync Replication" and click the "SETUP" button 580. In response, the GUI application 164 displays a screen like the screen 600 of FIG. 6, but which is tailored to VSP 1. The user may then establish VSP-specific synchronous replication settings for VSP 1, by providing input to the controls 610, 612, 614, and 616, for example. The user may also click the buttons 618 and 620 to establish failover settings and recovery settings, respectively, for VSP 1, e.g., in a manner similar to that described for "LUN 2" in connection with FIG. 5 in Section II above.

The GUI application 164 may store settings for VSP 1 in a file 630(1) or in some other data structure. Settings for other VSPs may be stored in other files or structures (e.g., 630(2), 630(3), . . . ), i.e., on a per-VSP basis.

The GUI application 164 sends the VSP-specific settings (e.g., the file 630(1) for VSP 1) to the replication manager 162, which receives the settings and applies them to establish replication sessions for each data object associated with the VSP in accordance with the VSP-specific settings. For example, the replication manager 162 queries the configuration database 170 to obtain the record for VSP 1, which provides a list of all of the data objects associated with VSP 1. The replication manager 162 then initiates a synchronous replication session for each of the data objects specified in the record, with the replication session for each data object conducted in accordance with the settings established for VSP 1. For operational reasons and in some examples, the replication manager may exclude the root file system for a VSP from replication, i.e., no replication session is conducted for the root file system. Rather, a new root file system containing site-specific information may be constructed for a VSP at the replica site. Similar operations may be repeated for other VSPs, e.g., for VSP 2, VSP 3, etc., using the VSP-specific settings for those VSPs.

The replication manager 162 thus handles the complexity of establishing settings for large numbers of individual data objects by receiving one set of settings for a VSP and applying the settings across all of the data objects associated with the VSP. If a VSP is associated with 100 different data objects, synchronous replication for all 100 objects can be handled by establishing one set of settings. The administrative burden of managing replication for large numbers of data objects is thus greatly reduced.

The replication manager 162 may orchestrate any number of replication sessions for a VSP, or for multiple VSPs, at any given time, with each replication session operating to replicate a respective set of data objects. For each replication session operated for a VSP, the replication manager 162 communicates with a replica site (e.g., with a counterpart replication manager at the replica site) and coordinates replication activities in accordance with the VSP-specific settings. In the event of a failure at the data storage system 116 that renders the VSP or the entire data storage system 116 unavailable, the replication manager at the replica site can orchestrate failover and/or recovery operations on each data object associated with the VSP in accordance with the same VSP-specific settings established in the replication manager 162 on the data storage system 116.

As the replication manager 162 conducts replication sessions for a VSP, the replication manager 162 can receive information describing file system restrictions that apply to individual data objects associated with the VSP on a per-data-object basis and provide such information to the replica site. The replica site then applies the identified restrictions to the replica. The replica for each data object of a VSP is thus made subject to the same restrictions as the original object.

Although the GUI application 164 accepts user input for establishing various replication settings for a VSP, the replication manager 162 may, in some examples, generate synchronous replication settings for a VSP on its own, automatically, and without user input, and initiate a replication session on each data object of the VSP with a respective destination object in accordance with the automatically generated, VSP-specific settings. Thus, replication may proceed for a VSP even if a user does nothing to establish replication settings.

Once the replication manager 162 receives synchronous replication settings for a particular VSP, the replication manager 162 configures the replication splitter 226 (FIGS. 2-4) to operate in accordance with the settings for that VSP. In an example, the replication manager 162 identifies a set of internal volumes (FIGS. 2 and 3) in the IO stack 140 that the object-volume mapping 224 maps to respective data object associated with the VSP. The replication manager 162 activates the replication splitter 226 on the identified volumes. Then, whenever the replication splitter 226 receives an IO request specifying data to be written to any of the internal volumes mapped to the data objects of the VSP, the replication splitter 226 performs replication activities in accordance with the VSP-specific settings. These include, for example, sending the IO request to the replication appliance 160 designated in the VSP-specific settings, configuring the buffer (e.g., 462), and so forth. Because the replication splitter 226 recognizes volumes and because the replication manager 262 can identify the internal volumes for all of the data objects of a VSP, the replication splitter 226 and the replication manager 260 together can manage replication on a per-VSP basis. This operation can be more fully understood with reference to FIG. 12.

Figure 12:
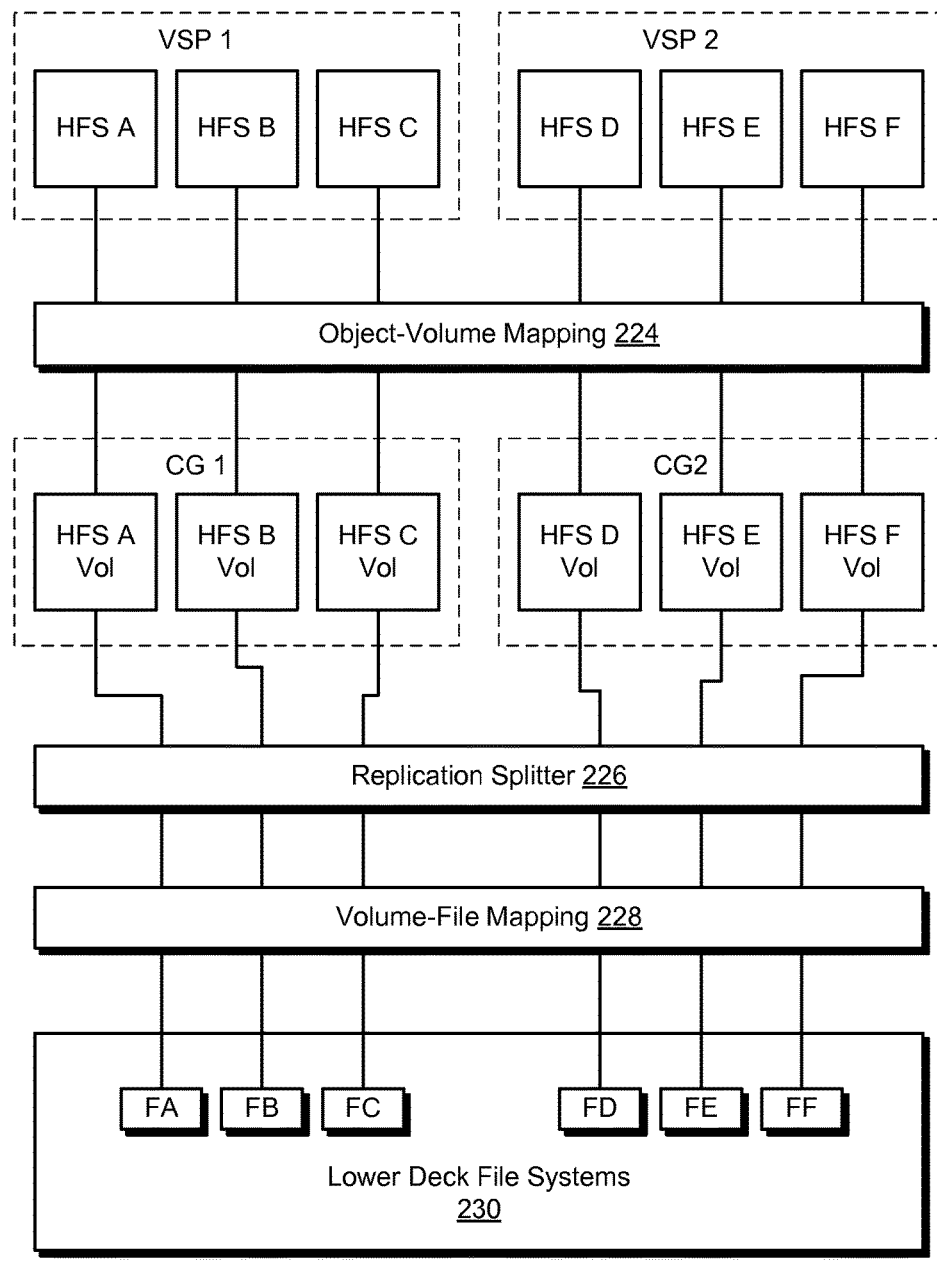
FIG. 12 is a block diagram of an IO stack of the data storage system of FIG. 1, which associates data objects of particular VSPs with respective consistency groups.

FIG. 12 shows a view of the IO stack 140 in which different VSPs are associated with respective consistency groups. The mapping shown in FIG. 12 of lower-deck files to data objects is similar to that shown in FIGS. 2 and 3, except that FIG. 12 shows data objects organized in VSPs and logical volumes organized in consistency groups. Here, the volume-file mapping 228 maps lower-deck files FA, FB, and FC to respective logical volumes HFS A Vol, HFS B Vol, and HFS C Vol. The volume-file mapping 228 also maps lower-deck files FD, FE, and FF to respective logical volumes HFS D Vol, HFS E Vol, and HFS F Vol. The object-volume mapping 224 then maps logical volumes HFS A Vol through HFS F Vol to respective host (upper-deck) file systems HFS A through HFS F. In this example, the host file systems HFS A, HFS B, and HFS C belong to a first VSP (VSP 1), and the host file systems HFS D, HFS E, and HFS F belong to a second VSP (VSP 2).

Once the replication manager 162 has received VSP-specific replication settings for VSP 1, the replication manager 162 identifies each data object associated with VSP 1 (e.g., by accessing the records 1100 for VSP 1). The replication manager 162 also identifies the logical volume that corresponds to each data object associated with VSP 1. In an example, the replication manager 162 obtains logical volume identities from a driver that manages the IO stack 140 or a portion thereof. The replication manager 162 may perform similar activities for VSP 2.

In an example, the replication manager 162 directs the replication splitter 226 to form a first consistency group CG 1 from the logical volumes that correspond to the data objects of VSP 1, i.e., HFS A Vol, HFS B Vol, and HFS C Vol. Similarly, the replication manager 162 directs the replication splitter 226 to form a second consistency group CG 2 from the logical volumes that correspond to the data objects of VSP 2, i.e., HFS D Vol, HFS E Vol, and HFS F Vol. The replication manager 162 then activates the replication splitter 226 to perform synchronous replication operations on a per-consistency-group basis. In particular, the replication manager 162 activates the replication splitter 226 to operate in accordance with a first set of synchronous replication settings for logical volumes belonging to CG 1 and to operate in accordance with a second set of synchronous replication settings for logical volumes belonging to CG 2, where the first set of synchronous replication settings are those specified for VSP 1 and the second set of replication settings are those specified for VSP 2. Since the volumes of CG 1 correspond to the data objects of VSP 1 and the volumes of CG 2 correspond to the data objects of VSP 2, the replication splitter 226 is made to operate on a per-VSP basis. Thus, as IO requests are received specifying data to be written to any data object of VSP 1, the replication splitter performs synchronous replication actions in accordance with the VSP-specific settings for VSP 1. Similarly, as IO requests are received specifying data to be written to any data object of VSP 2, the replication splitter performs synchronous replication actions in accordance with the VSP-specific settings for VSP 2.

With the replication splitter 226 configured according to VSP-specific settings, synchronous replication of data objects proceeds substantially as described in connection with FIG. 4 in Section II above, i.e., by rendering each IO request 112 as a block-based request, mirroring the block-based request to a replication appliance, and preventing the request from propagating further down the IO stack 140 until the replication appliance acknowledges that the data specified in the block-based request have been persisted at the replica site.

This section has presented a technique for managing replication of VSPs (Virtualized Storage Processors). Replication proceeds on a per-VSP basis by (i) identifying the data objects associated with a VSP, (ii) establishing a common set of replication settings across all of the data objects associated with the VSP, and (iii) replicating the VSP by replicating each of the identified data objects associated with the VSP in accordance with the common set of replication settings established across all of the data objects associated with the VSP. The improved technique avoids the need for administrators separately to configure and manage replication on large numbers of individual data objects and thus reduces administrative burdens.

V) Snap and Replicate to Generate Content-Consistent Snaps with Shared Snap Signatures:

Example techniques for performing snap-and-replicate operations will now be described in connection with FIGS. 13-16. The techniques presented in this section are consistent with those described in the sections above and may be performed in the same or a similar environment as those described above using the same or similar data storage systems, storage processors, and replication technologies.

Figure 13:
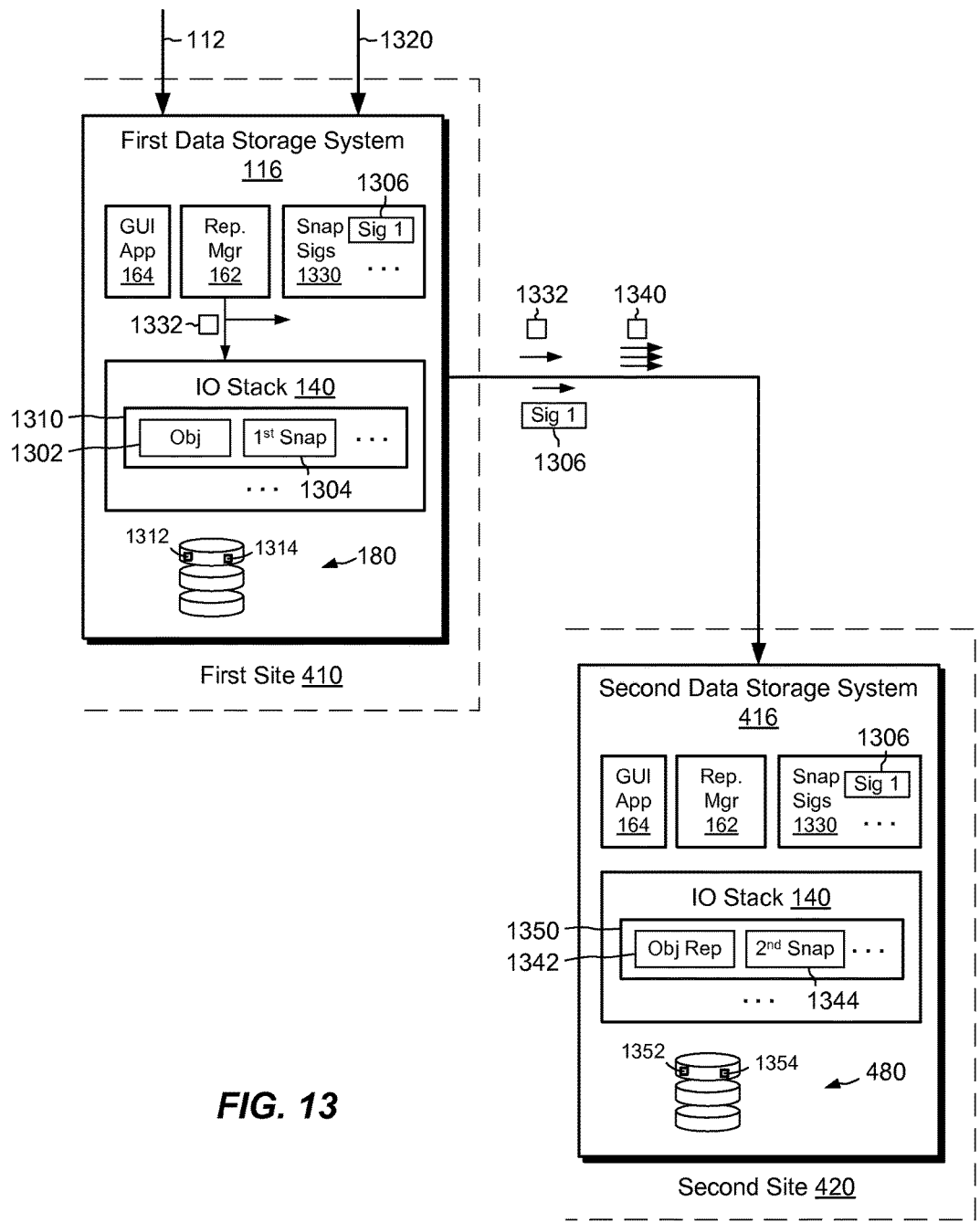
FIG. 13 is a block diagram showing an example technique for taking a pair of content-consistent snaps, one on a first data storage system and one on a second data storage system, and for applying the same snap signature to both of the pair of content-consistent snaps.

FIG. 13 shows an example arrangement for performing snap-and-replicate operations between a first data storage system 116 at a first site 410 and a second data storage system 416 at a second site 420. In the example shown, the first and second data storage systems 116 and 416 and their constituents are the same as or similar to those described above in connection with FIGS. 1, 4, and 8-10.

Here, the first data storage system 116 stores one or more data objects, including a data object 1302 ("Obj"). The data object 1302 may provide a LUN, a file system, a vVOL, or any other type of data object realized in the form of a container file within a lower-deck file system 1310 (e.g., an internal file system of the kind described in connection with FIGS. 2, 3, 8, 9, and 12 above). In this example, the first data storage system stores the data object 1302 in physical blocks 1312 of storage 180 (FIG. 1). The second data storage system 416 is coupled to the first data storage system 116, e.g., over the network 114 (FIG. 1), and maintains a replica 1342 ("Obj Rep") of the data object 1302. For example, the replication managers 162 on the data storage systems 116 and 416 coordinate one or more replication sessions to effect replication of the data object 1302 on the first data storage system 116 to the replica 1342 on the second data storage system 416. The second data storage system 416 stores the replica 1342 in physical blocks 1352 of storage 480.

In operation, the first data storage system 116 receives IO requests 112, e.g., from hosts 110(1) to 110(N) (FIG. 1), which IO requests include requests designating data to be written to the data object 1302. Using any type of replication technology, e.g., synchronous or asynchronous, continuous or snapshot shipping, the replication managers 162 coordinate transfers of data 1340 for the data object 1302, e.g. including changes resulting from and/or prescribed by IO requests 112, from the first data storage system 116 to the second data storage system 416. The replication manager 162 on the second data storage system 416 updates the replica 1342 with the data 1340 to keep the replica 1342 approximately current with the data object 1302 to within specified replication settings, e.g., those described in connection with FIGS. 5-7.

In the course of conducting the above-described replication operations on the data object 1302, the first data storage system 116 encounters an instruction 1320 to perform snap-and-replicate operations. The instruction 1320 may arrive from a user, such as an administrator operating the GUI application 164, or it may be generated internally, e.g., in response to previously established replication settings. Upon encountering the instruction 1320, the first data storage system 116 coordinates with the second data storage system 416 (e.g., via their respective replication managers 162 coordinating via message(s) 1332) to generate a pair of content-consistent snaps of the data object 1302 and its replica 1342. The content-consistent snaps include a first snap 1304 of the data object 1302 on the first data storage system 116 and a second snap 1344 of the replica 1342 on the second data storage system 416. The two snaps are content-consistent because the content of the replica 1342 at the time the second data storage system 416 takes the second snap 1344 matches the content of the data object 1302 at the time the first data storage system 116 takes the first snap 1304. The first data storage system 116 stores the first snap 1344 in physical blocks 1314 of the storage 180, and the second data storage system 416 stores the second snap 1344 in physical blocks 1354 of the storage 480.

Upon generating the first snap 1304, or shortly thereafter, the first data storage system 116 generates a snap signature 1306 ("Sig 1") of the first snap 1304. The snap signature 1306 identifies the first snap 1304 from among other snaps (not shown) on the first data storage system 116. For example, the snap signature 1306 may include an identifier of the data storage system 116, an identifier and/or name of the data object 1302 being snapped, the time and date of the snap, and/or other identifying information. Once the first data storage system 116 generates the snap signature 1306, the first data storage system 116 sends the snap signature 1306 to the second data storage system 416. The second data storage system 416 receives the snap signature 1306 and applies the snap signature 1306 to the second snap 1344. Thus, the same snap signature 1306 that identifies the first snap 1304 on the first data storage system 116 also identifies the second snap 1344 on the second data storage system 416. The first and second data storage systems 116 and 416 each store the snap signature 1306 in a respective database 1330 of snap signatures, which may be located anywhere on the respective systems.

The above-described snap-and-replicate operations may be repeated to generate any number of pairs of content-consistent snaps of the data object 1302 and its replica 1342, as the data object 1302 changes over time, with each pair of content-consistent snaps having its own snap signature. In this manner, the second data storage system 416 stores a repository of "second" snaps of the replica 1342, which are equivalent to respective "first" snaps of the data object 1302 taken on the first data storage system 116. Should a failure occur at the first data storage system 116 that damages or makes unavailable first snaps of the data object 1302, users can continue to access equivalent second snaps from the second data storage system 416 using the same snap signatures as were used for accessing the first snaps from the first data storage system 116. Thus, not only do the techniques hereof provide measures for providing access to the replica 1342 of the data object 1302 after a failure, but also for providing access to its snaps. The second data storage system 416 thus serves as a backup site both for the object 1302 and for its snaps. Administrators can restore from this backup, e.g., by copying the replica 1342, its snaps, and its snap signatures back to the first data storage system 116 (e.g., after operation of the first data storage system 116 resumes) or to some other data storage system.

In some examples, the first and second data storage systems 116 and 416 have different snap retention policies and recycle snaps at different rates. For example, the first data storage system 116 may recycle snaps weekly (i.e., delete new snaps after one week), whereas the second data storage system may recycle snaps monthly. Thus, situations may arise in which first snaps of the object 1302 have been deleted from the first data storage system 116 while corresponding second snaps of the replica 1342 remain on the second data storage system 416.

In some examples, the first data storage system 116 groups together multiple data objects using consistency groups or other types of groups, For example, VSPs (Virtualized Storage Processors) may use consistency groups to group together multiple file systems (see Section IV above). The snap-and-replicate technique described herein extends to consistency groups and to other types of groups by ensuring not only that the snaps of each pair of content-consistent snaps are consistent between data storage systems 116 and 416, but also that snaps are consistent among all data objects that make up each group on each side. Assume, for example, that the first data storage system 116 hosts a VSP including ten file systems, with each file system realized as a data object like the data object 1302. The replication managers 162 perform replication operations on each of the ten objects, establishing and maintaining replicas of the respective data objects on the second data storage system 416. Upon encountering an instruction 1320 to perform a snap-and-replicate operation, the first data storage system 116 takes a first snap of each of the data objects of the VSP relative to the same point in the incoming IO stream. For example, the first data storage system 116 may pause its processing of IO requests 112 momentarily and then take first snaps of all ten data objects that make up the VSP. Once the first snaps are all taken, the first data storage system 116 can resume normal processing of IO requests 112. At the second data storage system 416, coordination among the replication managers 162 (e.g., via the message(s) 1332) ensures consistency among all second snaps taken of all replicas. Although the above-described example uses consistency groups to group data objects together, it should be understood that snap-and-replicate operations for groups of objects are not limited to consistency groups, per se, or any particular replication technology. Also, it should be understood that snap-and-replicate operations as applied to groups are not limited to any particular type of data object or objects. Rather, groups can include data objects realizing file systems, LUNs, vVOLs, and/or other objects and any single group can include objects of any type or of multiple types.

Figure 14:
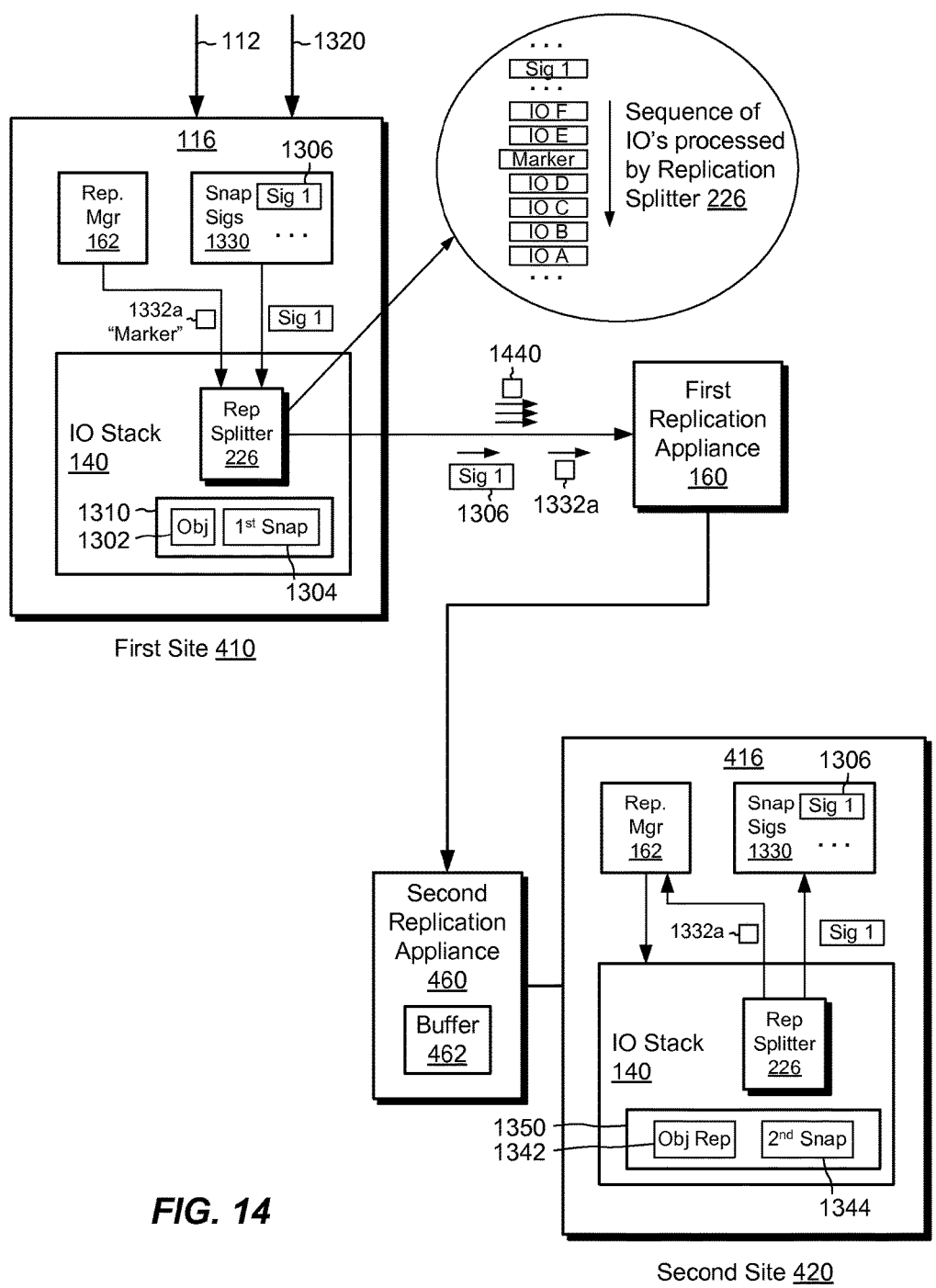
FIG. 14 is a block diagram showing a particular example of the technique of FIG. 13 conducted using a continuous replication technology.

FIG. 14 shows an example arrangement for performing snap-and-replicate operations using continuous replication technology. The continuous replication technology may be configured for performing synchronous replication, as described in connection with FIG. 4 above, or may be configured for performing asynchronous replication, as described in connection with FIG. 10 above, using the same or similar components as those described in the examples above. A suitable non-limiting example of continuous replication is the above-described RecoverPoint system available from EMC Corporation of Hopkinton, Mass.

Here, the IO stacks 140 of the first and second data storage systems 116 and 416 are each seen to include a replication splitter 226, which may be the same or similar to the replication splitter 226 of FIGS. 2, 3, 4, 10, and 12. Each replication splitter 226 operates in connection with one or more replication appliances. For example, the replication splitter 226 in the first data storage system 116 operates in connection with a first replication appliance 160 and the replication splitter 226 in the second data storage system 416 operates in connection with a second replication appliance 460. As before, the second replication appliance 460 includes a buffer 462, for receiving and queuing IO requests received from the first replication appliance 160.

In example operation, the replication managers 162 on the first and second data storage systems 116 and 416 coordinate to perform continuous replication of the data object 1302. As the IO stack 140 processes IO requests 112 designating data to be written to the data object 1302, the replication splitter 226 intercepts the IO requests and mirrors them as replication data 1440 to the first replication appliance 160. The first replication appliance 160 forwards the replication data 1440 to the second replication appliance 460, which stores the data 1440 in the buffer 462. The replication appliance 460 de-stages the data 1440 from the buffer 462 to the object replica 1342. For example, the replication manager 162 in the second data storage system 416 directs the replication appliance 460 to send IO requests queued and stored in the buffer 462 to the replication splitter 226 in the second data storage system 416. The splitter 226 receives the mirrored IO requests and processes them in the order received to effect write operations on the replica 1342. Back at the first data storage system 116, and after receiving appropriate acknowledgements, the replication splitter 226 allows the intercepted IO requests to propagate farther down the IO stack 140 to effect parallel write operations on the data object 1302.

When the above-described continuous replication is performed synchronously, the replication splitter 226 in the first data storage system 116 may hold off the processing of each intercepted IO request until it receives an acknowledgement from the second replication appliance 460 that the respective IO request has been persisted at the second site (e.g., in the buffer 462). In this manner, each IO request designating data to be written to the data object 1302 is individually replicated to the second site 420 in the order in which the IO request is processed by the IO stack 140 on the first data storage system 116. Further, the first data storage system 116 performs each write operation on the data object 1302 only after its replication splitter 226 receives an acknowledgement that the mirrored IO request has been safely persisted at the second site 420.

When the above-described continuous replication is performed asynchronously, the replication splitter 226 on the first data storage system 116 intercepts IO requests and mirrors the requests to the first replication appliance 160, as above, but here the splitter 226 holds off the IO request only briefly and allows the IO request to propagate further down the IO stack 140 upon receiving an acknowledgement from the first replication appliance 160 that the appliance 160 has persisted the respective IO request locally. The first replication appliance 160 accumulates multiple IO requests in this manner and forwards the requests to the second site 420 as needed to meet asynchronous replication settings. At the second site 420, the second replication appliance 460 receives the mirrored IO requests and stores them in the buffer 462, and the replication manager 162 on the second data storage system 416 directs de-staging of the buffered IO requests in order to the replica 1342. Like the synchronous replication example above, the order of IO requests is preserved, such that mirrored IO requests are applied to the replica 1342 in the same order as the order in which the original IO requests are applied to the data object 1302. Unlike the synchronous replication example above, however, IO requests are held by the first replication appliance 160 and only mirrored to the second site 420 as needed to meet replication settings.

While the above continuous synchronous or asynchronous replication operations are underway for replicating the data object 1302 to the replica 1342, the first data storage system 116 may encounter an instruction 1320 to perform snap-and-replicate operations on the data object 1302. In response to the instruction 1320, the replication manager 162 sends a "marker" 1332*a* to the replication splitter 226 on the first data storage system 116. The marker 1332*a* designates a point relative to the sequence of IO requests being processed by the first data storage system 116 at which a pair of content-consistent snaps are to be taken.

The replication splitter 226 receives the marker 1332*a* and creates a new IO request that includes or otherwise represents the marker 1332*a*. For example, the splitter 226 creates the new IO request as a data write request that specifies no data. More generally, the marker 1332*a* is provided as any distinguishable IO request that marks the point relative to the IO stream for taking the pair of content-consistent snaps. As shown in the bubble region of FIG. 14, the marker 1332*a* is seen to be located within a sequence of IO requests (IO A through IO F) being processed by the replication splitter 226 and mirrored to the second site 420.

With the marker 1332*a* sent or on its way to the second site 420, the first and second data storage systems 116 and 416 coordinate to perform parallel, but not necessarily simultaneous, snapping operations to create the pair of content-consistent snaps. According to some examples, upon receiving an acknowledgement that the marker 1332*a* is safely in transit to or has arrived at the second site 420, the replication splitter 226 on the first data storage system 116 coordinates with its local replication manager 162 to take the first snap 1304 of the data object 1302. The first data storage system 116 takes the first snap 1304 once the IO stack 140 has processed all pending IO requests prior to the marker 1332*a* (e.g., IO's A through D as shown in the bubble region). It may be necessary in some examples briefly to pause the processing of IO requests to the data object 1302 while the first data storage system 116 takes the first snap 1304. Once the first snap 1302 has been taken, the processing of IO requests can resume as usual (e.g., for processing IO requests IO E and IO F).

At the second data storage system 416 and according to some examples, the replication manager 162 directs the second replication appliance 460 to de-stage mirrored IO requests stored in the buffer 462 to the replica 1342. The mirrored IO requests include the marker 1332*a*. To de-stage IO requests from the buffer 462, the second data storage system 416 conveys the buffered IO requests, e.g., one at a time and in order, to the replication splitter 226 in the second data storage system 416. Upon encountering the marker 1332*a*, the replication splitter 226 coordinates with its local replication manager 162 to take the second snap 1344, i.e., once the local IO stack 140 has processed all pending IO requests directed to the replica 1342 prior to the marker 1332*a* (e.g., IO's A through D). It may be necessary briefly to pause the processing of IO requests to the replica 1342 while the second snap 1344 is being taken. The processing of IO requests can then resume as usual (e.g., for IO requests IO E and IO F).

Once the first data storage system 116 has generated the first snap 1304 (or earlier in some examples), the first data storage system 116 generates a snap signature 1306 and applies the snap signature 1306 to the first snap 1304. The replication managers 162 in the two data storage systems 116 and 416 coordinate to send the snap signature 1306 to the second data storage system 416, and the second data storage system 416 applies the snap signature 1306 to the second snap 1344.

In one example, the two replication managers 162 coordinate to transmit the snap signature 1306 in an IO request, which the replication splitter 226 and replication appliances 160 and 460 may convey from the first data storage system 116 to the second data storage system 416. For example, the replication splitter 226 in the first data storage system 116, in response to a message from its local replication manager 162, creates a metadata IO request that includes the snap signature 1306. The replication splitter 226 sends the metadata IO request to the replication appliance 160 in line with other IO requests being processed, and the first replication appliance 160 conveys the metadata IO to the second replication appliance 460. The snap signature 1306 thus arrives at the second data storage system 416 over the same transport as do the replicated data IOs 1440 and as does the marker 1332*a*. Upon encountering the snap signature 1306 at the second data storage system 416, the local replication manager 162 applies the snap signature 1306 to the second snap 1344.

It should be understood that the timing and sequencing of events as described above can be varied while still accomplishing similar results. In some examples, an implementation may direct the second data storage system 416 to take the second snap 1344 before directing the first data storage system 116 to take the first snap 1304. In other examples, the first snap 1304 is taken first, but the first snap 1304 may be deleted if the marker 1332*a* fails to arrive safely at the second site 420. Many variations are contemplated. In some examples, the first snap 1304 and the snap signature 1306 are created before mirroring the marker 1332*a* to the second data storage system 416. In such examples, the marker 1332*a* may itself include the snap signature 1306, i.e., the marker 1332*a* and the snap signature 1306 may be conveyed to the second data storage system 416 in a single IO request.

Using the above-described continuous replication technology, the data storage systems 116 and 416 can perform any number of snap-and-replicate operations over time, as replication operations keep the replica 1342 in sync with the data object 1302 and the markers 1332a designate points relative to IO requests at which content-consistent snaps can be taken. As demonstrated in the examples above, continuous replication technology supports snap-and-replicate operations for both synchronous replication and asynchronous replication.

When performing snap-and-replicate operations on a consistency group using continuous replication, the replication manager 162 can activate the replication splitter 226 in the first data storage system 116 to treat all data objects that make up the consistency group as a single object. Thus, the marker 1332a created for a consistency group applies to all data objects that make up that group. The IO stack 140 processes all IOs up to the point designated by the marker and then snaps all data objects of the consistency group. At the second site 420, the IO stack 140 processes all IOs read from the buffer 462 up to the point designated by the marker 1332a and, upon encountering the marker 1332a, snaps all replicas for each object of the consistency group before resuming. Thus, a different pair of content-consistent snaps is generated for each data object of the consistency group, and all such content-consistent snaps are consistent with one another as they are all based on the same point relative to the IO stream, i.e., as designated by the marker 1332a.

Figure 15:
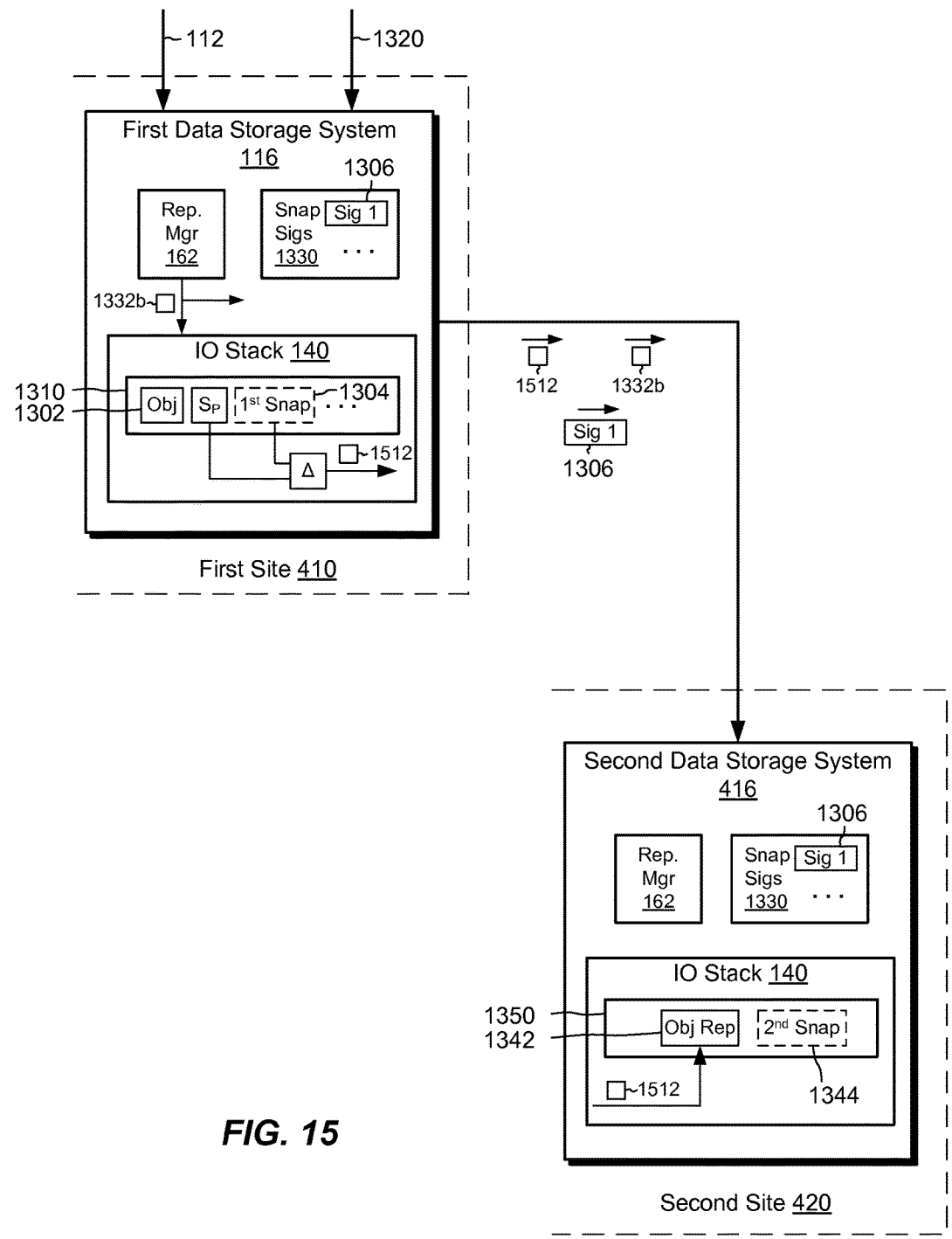
FIG. 15 is a block diagram showing another particular example of the technique of FIG. 13 conducted using a snapshot shipping replication technology.

FIG. 15 shows an example arrangement for performing snap-and-replicate operations using snapshot shipping replication technology, such as that presented above in connection with FIGS. 8 and 9. Here, snapshot shipping replication is carried out on the data object 1302 on the first data storage system 116 by taking snaps of the data object 1302, calculating deltas (differences) between consecutive snaps, and sending the deltas to the second data storage system 416. The second data storage system 416 applies the deltas to the replica 1342 to bring the content of the replica 1342 into agreement with the content of the data object 1302. Replication settings for the data object (FIGS. 5 and 7) specify the frequency (e.g., hourly, daily, weekly, etc.) at which snapshot shipping replication operations are performed. A suitable non-limiting example of snapshot shipping replication technology is the above-described Celerra Replicator V2, which is available from EMC Corporation of Hopkinton, Mass.

In the course of conducting snapshot shipping replication operations on the data object 1302, e.g., while snapshot shipping replication is operating on a schedule to update the replica 1342 periodically, the first data storage system 116 may receive an instruction 1320 to perform snap-and-replicate operations on the data object 1302. In response to the instruction 1320, the replication managers 162 on the first and second data storage systems 116 and 416 coordinate, e.g., using message(s) 1332b, to generate a pair of content-consistent snaps that reflect a current state of the data object 1302. For example, the first data storage system 116 takes a first snap 1304 of the data object 1302 and computes a delta 1512 between the first snap 1304 and an immediately prior snap ("$S_P$"). The prior snap $S_P$ may be a snap taken during a previous snapshot shipping replication operation on the data object 1302 or a more recently taken user snap. The two replication managers 162 coordinate to transfer the delta 1512 to the second data storage system 416, whereupon the local replication manager 162 directs the following operations. First, the local replication manager 162 updates the replica 1342 with the contents of the delta 1512. Once the replica 1342 has been updated with the delta 1512, the content of the replica 1342 matches the content of the first snap 1304. Second, the local replication manager 162 takes a second snap 1344 of the replica 1342. The second snap 1344 provides a point-in-time version of the replica 1342 after the replica 1344 has been updated with the delta 1512 and thus includes the same content as the first snap 1304. In this manner, the first snap 1304 and the second snap 1344 form a pair of content-consistent snaps. The first data storage system 116 generates a snap signature 1306 and applies the snap signature 1306 to the first snap 1304. In an example, the two replication managers 162 coordinate to transfer the snap signature 1306 to the second data storage system 416, which stores the snap signature 1306 in the local database 1330 and applies the snap signature 1306 to the second snap 1344. Thus, the same snap signature 1306 is applied both to the first snap 1304 on the first data storage system 116 and to the second snap 1344 on the second data storage system 416, thus allowing the two snaps to be accessed interchangeably.

The replication managers 162 may effect transfer of the snap signature 1306 to the second data storage system 416 at any suitable time and/or in any suitable manner. In one particular example, snapshot shipping replication operations proceed in distinct replication sessions, with each session including (i) a pre-transfer phase in which a new snap is taken at the first data storage system 116 and a delta is calculated, (ii) a transferring phase in which the delta is sent to the second data storage system 416, and (iii) a post-transfer phase when the delta is applied to an existing replica at the second data storage system 416. In this particular example, the replication managers 162 coordinate to transfer the snap signature 1306 to the second data storage system 416 within a replication session during the post-transfer phase.

As before, the first data storage system 116 can encounter any number of instructions 1320 for performing snap-and-replicate operations on the data object 1302. In response to each instruction 1320, the replication managers 162 cooperate to generate a respective pair of content-consistent snaps, each including a first snap 1304 and second snap 1344, generate a snap signature 1306 for the first snap 1304, and apply the snap signature 1306 both to the first snap 1304 on the first data storage system 116 and to the second snap 1344 on the second data storage system 416.

Also as before, different data objects, like the object 1302, may be arranged in groups on the first data storage system 116. In response to receiving an instruction 1320 to perform snap-and-replicate operations on a data object that is a member of a group, the replication managers 162 coordinate to take a pair of content-consistent snaps of each data object in the group and its replica. To maintain consistency among data objects of the group on the first data storage system 116, the local replication manager 162 may direct the local IO stack 140 to pause its processing of IO requests 112 directed to any object that is a member of the group while the local replication manager 162 takes a first snap (like 1304) of each data object in the group. The local replication manager 162 may then direct the IO stack 140 to resume normal processing of IO requests 112 once all of the first snaps are taken. For each first snap taken, the replication manager 162 computes a respective delta (like 1512) and sends the delta to the second data storage system 416, where the local replication manager 162 in the second data storage system 416 updates a respective replica (like the replica 1344) and generates a respective second snap (like the second snap 1344). The replication managers 162 further cooperate to generate a snap signature (like 1306) for each first snap of data objects in the group and to apply the snap signature for each object both to the first snap of the respective object on the first data storage system 116 and to the second snap of the respective object on the second data storage system 416. Thus, snapshot shipping replication technologies can be used for performing snap-and-replicate operations on groups of objects as well as on individual objects.

Figure 16:
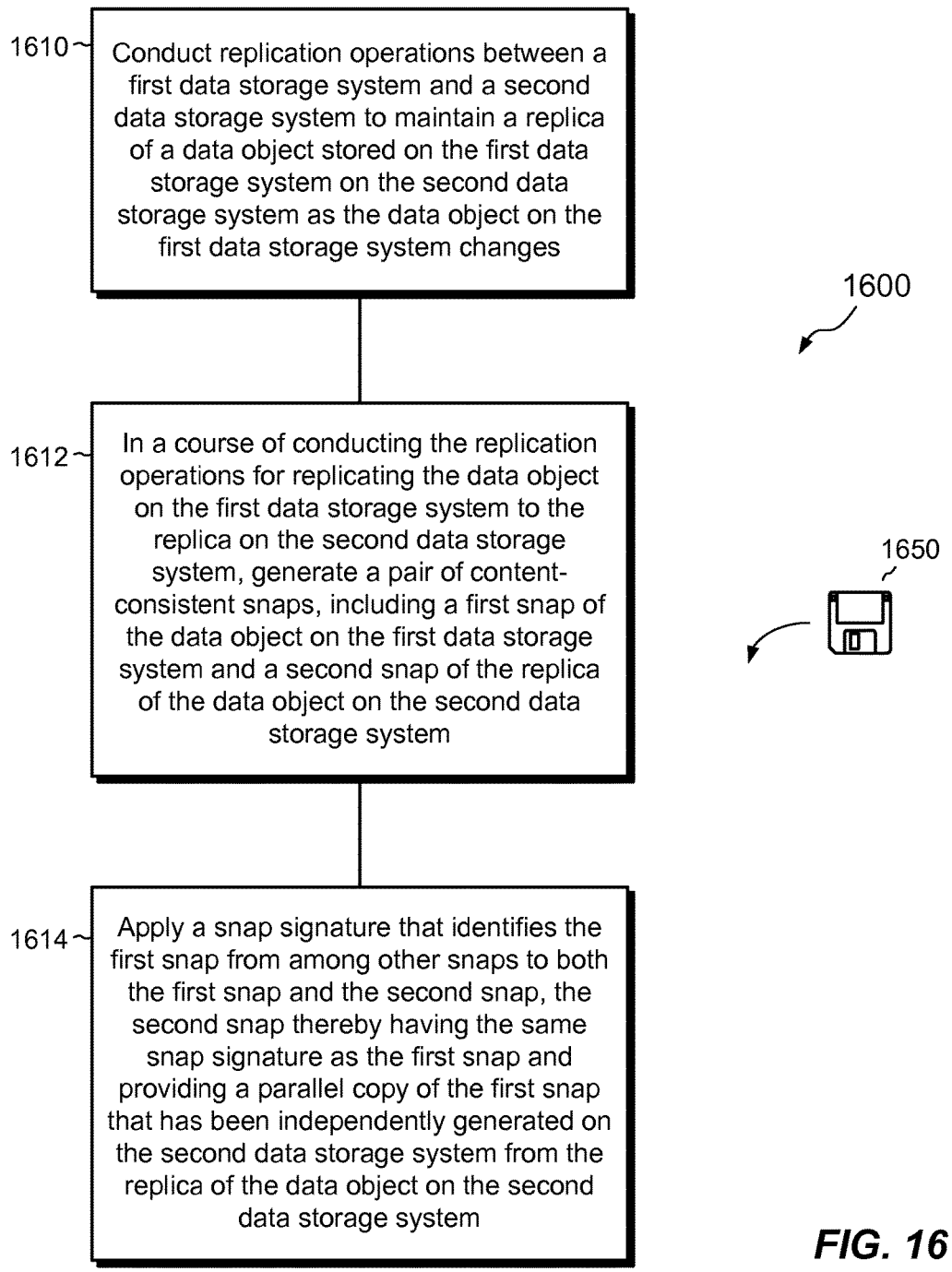
FIG. 16 is a flowchart showing an example process for managing data protection of a data object.

FIG. 16 shows an example process 1600 for managing data protection for a data object stored on a first data storage system. The method 1600 may be carried out, for example, in connection with the data storage systems 116 and 416, such as by the software constructs described in connection with FIGS. 1-3 and 13-15, which reside in the memories 130 of respective storage processors 120 and are run by the respective sets of processing units 124. The various acts of the method 1600 may be ordered in any suitable way. Accordingly, embodiments may be constructed in which acts are performed in orders different from those illustrated, which may include performing some acts simultaneously, even though the acts are shown as sequential in the illustrated embodiments.

At step 1610, replication operations are conducted between a first data storage system and a second data storage system to maintain a replica of a data object stored on the first data storage system on the second data storage system as the data object on the first data storage system changes. For example, continuous or snapshot shipping, synchronous or asynchronous replication operations are conducted between the first data storage system 116 and the second data storage system 416 to maintain a replica 1344 of the data object 1302 on the first data storage system 116 as the data object 1302 changes, e.g., in response to the first data storage system 116 processing IO requests 112 specifying data to be written to the data object 1302.

At step 1612, and in the course of conducting the replication operations for replicating the data object on the first data storage system to the replica on the second data storage system, a pair of content-consistent snaps is generated, including a first snap of the data object on the first data storage system and a second snap of the replica of the data object on the second data storage system. For example, while continuous or snapshot shipping, synchronous or asynchronous replication operations are ongoing or conducted periodically according to a replication schedule, a pair of content-consistent snaps is generated. The pair of content-consistent snaps includes a first snap 1304 of the data object 1302 and a second snap 1344 of the replica 1342.

At step 1614, a snap signature that identifies the first snap from among other snaps is applied to both the first snap and the second snap, the second snap thereby having the same snap signature as the first snap and providing a parallel copy of the first snap that has been independently generated on the second data storage system from the replica of the data object on the second data storage system. For example, the replication manager 162 on the first data storage system 116 generates a snap signature 1306 that identifies the first snap 1304 (e.g., using name, timestamp, etc.). The replication managers 162 on the data storage systems 416 coordinate to apply the same snap signature 1306 to both the first snap 1304 and the second snap 1306, thereby ensuring that the second snap 1344 can be accessed using the same snap signature as the first snap 1304 and that the two snaps are functionally interchangeable from the standpoint of backup and recovery.

VI) Changing Replication Transports Using Content-Consistent Snaps as a Common Base:

Example techniques for switching replication transports used for replicating a data object are now described in connection with FIGS. 17-21. The example techniques presented in this section employ one replication technology for performing replication operations initially, and then, after taking a pair of content-consistent snaps, one snap at the source and another snap at the destination, employ a second replication technology going forward, using the pair of content-consistent snaps as a common base. In some examples, replication technologies may be switched back and forth at will, with a pair of content-consistent snaps marking each transition. The techniques presented in this section are consistent with those described in the sections above and may be performed in the same or a similar environment as those described above using the same or similar data storage systems, storage processors, and replication technologies.

FIG. 17 shows an example representation 1700 of the replication manager 162, e.g. as described in connection with any of the above figures, operating in connection with various replication transports. The term replication "transport" describes aspects of a replication technology that pertain to acquiring updated data for a data object, transmitting the updated data from a source to a destination, and updating the replica at the destination. FIG. 17 shows two example replication transports—a continuous replication transport 1710 and a snapshot shipping replication transport 1720. A suitable non-limiting example of a continuous replication transport is provided with the RecoverPoint system, and a suitable non-limiting example of a snapshot shipping replication transport is provided with the Celerra Replicator V2, both of which are available from EMC Corporation of Hopkinton, Mass. The representation 1700 shows the replication manager 162 controlling and operating both replication transports 1710 and 1720, with the ability to substitute one replication transport for another at user direction and/or as situations favoring one transport over the other arise. Although FIG. 17 shows only two replication transports, it should be understood that the technique can be generalized to include any number of replication transports of any types. The inventive aspects of the techniques hereof should therefore not be construed as limited to any particular set of replication transports.

Figure 19:
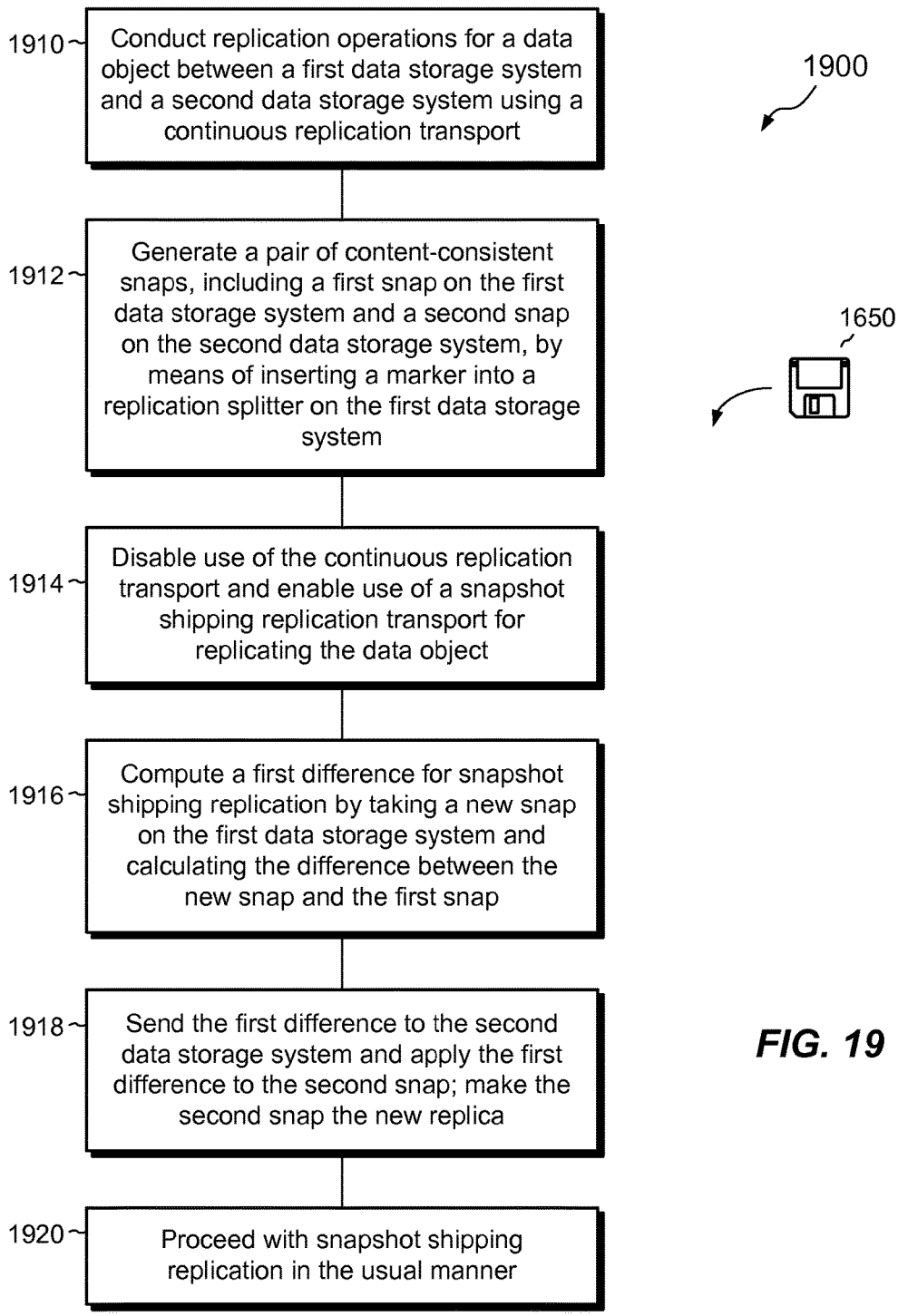
FIG. 19 is a flowchart showing a particular example of the technique of FIG. 18, where replication begins with a continuous replication transport and proceeds to a snapshot shipping replication transport.
Figure 20:
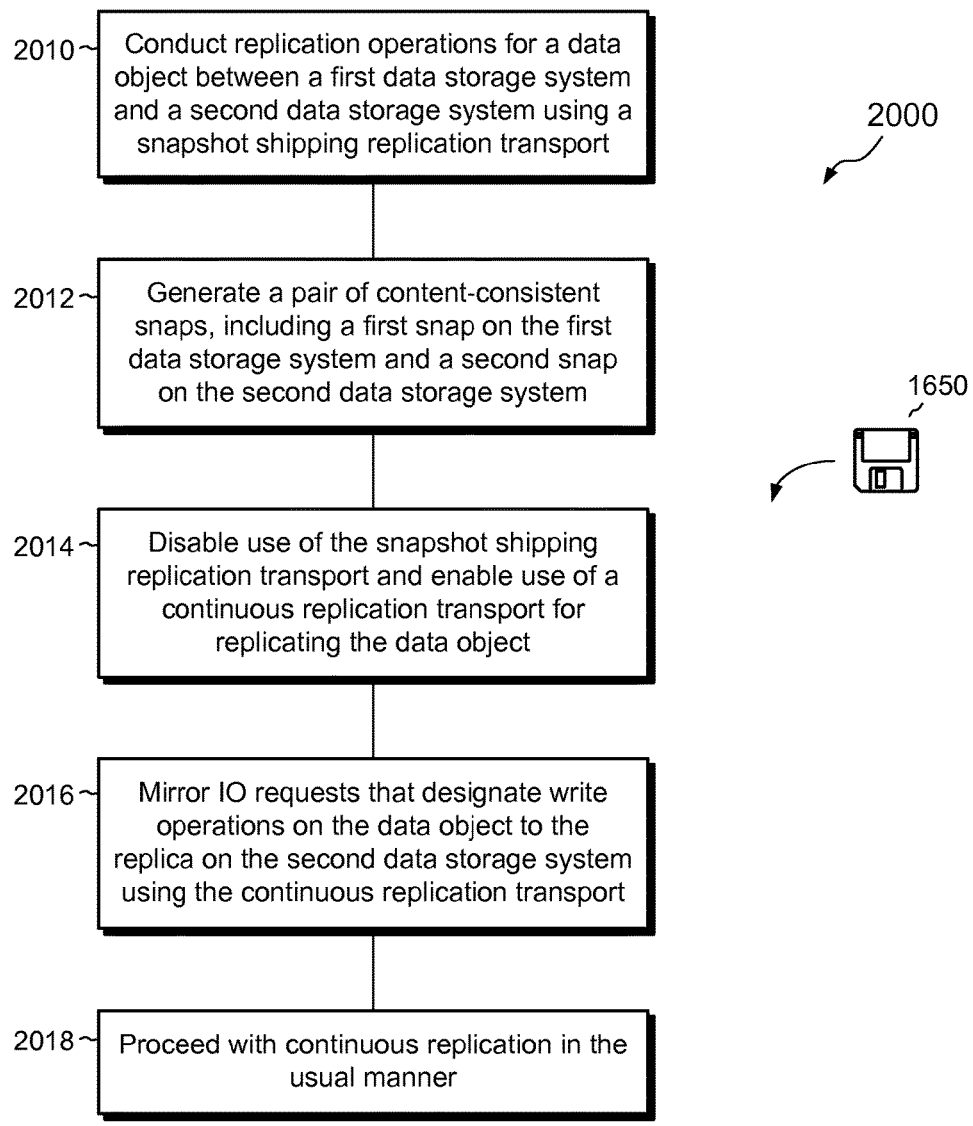
FIG. 20 is a flowchart showing another particular example of the technique of FIG. 18, where replication begins with a snapshot shipping replication transport and proceeds to a continuous replication transport.
Figure 21:
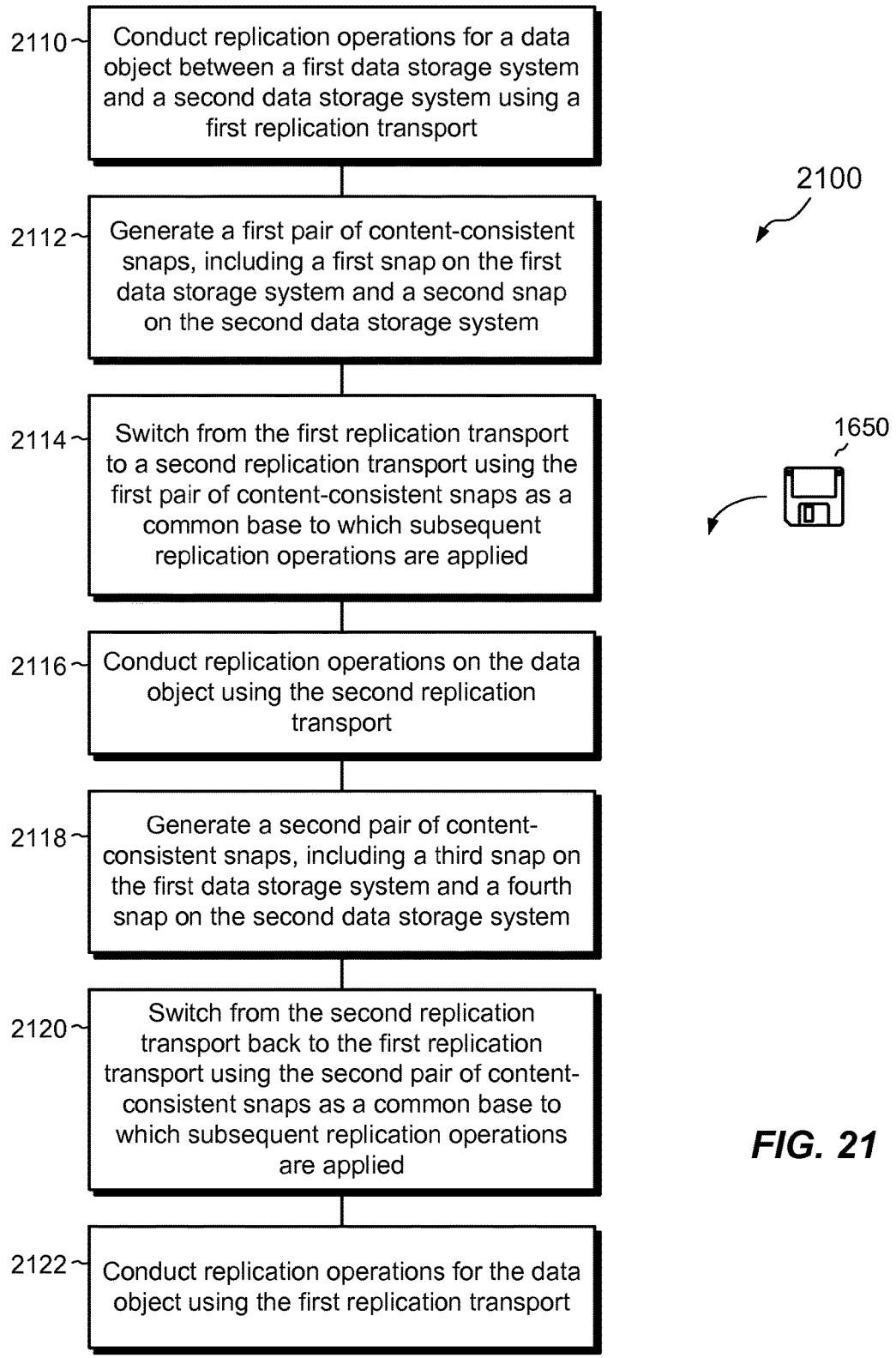
FIG. 21 is a flowchart showing an example process for switching back and forth between replication transports using pairs of content-consistent snaps as common bases.

FIGS. 18-21 show example methods 1800, 1900, 2000, and 2100, for using content-consistent snaps, such as those described in Section V, to provide a common base for changing replication transports while continuing to replicate a data object without loss of data on the replica. FIG. 18 presents a general case, and FIGS. 19-21 present more specific examples. The methods 1800, 1900, 2000, and 2100 may be carried out, for example, in connection with the data storage systems 116 and 416, such as by the software constructs described in connection with FIGS. 1-3 and 13-15, which reside in the memories 130 of respective storage processors 120 and are run by the respective sets of processing units 124. The various acts of the methods 1800, 1900, 2000, and 2100 may be ordered in any suitable way. Accordingly, embodiments may be constructed in which acts are performed in orders different from those illustrated, which may include performing some acts simultaneously, even though the acts are shown as sequential in the illustrated embodiments.

FIG. 18 shows a process 1800 for using content-consistent snaps as a common base for changing replication transports. At 1810, replication operations are conducted for a data object between a first data storage system and a second data storage system using a first replication transport. For example, replication mangers 162 on a first and second data storage systems 116 and 416 coordinate to perform replication operations on a data object 1302 to a replica 1344 (FIGS. 13-15). The replication operations may involve the use of a continuous replication transport 1710 or a snapshot shipping transport 1720. The replication operations may alternatively involve the use of some other kind of replication transport (not shown).

At 1820, a pair of content-consistent snaps is generated, including a first snap on the first data storage system and a second snap on the second data storage system. For example, the first data storage system 116 takes a first snap 1304 of the data object 1302, and the second data storage system 416 takes a second snap 1344 of the data object 1342. In some examples, generating the pair of content-consistent snaps is performed in response to an instruction (like 1320 of FIG. 13) for performing snap-and-replicate operations.

At 1814, the replication transport switches from the first replication transport to a second replication transport. The pair of content-consistent snaps is used as a common base to which subsequent replication operations are applied. Various examples are contemplated. In one example, the first replication transport is the continuous replication transport 1710 and the second replication transport is the snapshot shipping transport 1720. In another example, the first replication transport is the snapshot shipping transport 1720 and the second replication transport is the continuous replication transport 1710. In either case, the pair of content-consistent snaps forms a common base for transitioning from the first replication transport to the second replication transport.

In an example, a snap signature 1306 (FIG. 13) is created by the first replication transport and applied to both the first snap 1304 and the second snap 1344. In some examples, the snap signature 1306 is compatible with both the first replication transport and the second replication transport, and thus helps to facilitate handoff from the first replication transport to the second replication transport.

FIG. 19 shows an example method 1900 of switching from a continuous replication transport 1710 to a snapshot shipping transport 1720. At 1910, replication operations are conducted for a data object between a first data storage system and a second data storage system using a continuous replication transport. For example, replication of the data object 1302 to the replica 1342 may proceed using the continuous replication transport 1710, in the manner described in connection with FIG. 14 above, with replication proceeding synchronously or asynchronously.

At 1912, a pair of content-consistent snaps is generated, including a first snap on the first data storage system and a second snap on the second data storage system. The pair of content-consistent snaps is generated by means of inserting a marker into a replication splitter on the first data storage system. For example, as described in connection with FIG. 14, the splitter 226 in the first data storage system 116 inserts a marker 1332a into a sequence of IO requests. The marker 1332a marks a point relative to the IO requests at which the pair of content-consistent snaps is to be taken. The first data storage system 116 takes the first snap 1304 of the data object 1302 after applying all IO requests up to the point designated by the marker 1332a in the IO stream. The second data storage system 416 takes the second snap 1344 after applying all mirrored IO requests to the replica 1342 up to the point designated by the marker 1332a in the mirrored IO stream. In some examples, generating the pair of content-consistent snaps is performed in response to an instruction (like 1320 of FIG. 14) for performing snap-and-replicate operations.

At 1914, use of the continuous replication transport 1710 is disabled and use of a snapshot shipping replication transport 1720 is enabled for replicating the data object 1302 to the replica 1342. For example, the replication managers 162 on the first and second data storage systems 116 and 416 cooperate to change replication transports for replicating the data object 1302. In an example, the newly enabled snapshot shipping replication transport 1720 uses the pair of content-consistent snaps as a common base for subsequent snapshot shipping replication activities. The changeover in replication transports may be further facilitated through the use of a snap signature 1306 applied to both snaps of the pair of content-consistent snaps and recognized by both the continuous replication transport 1710 and the snapshot shipping replication transport 1720.

At 1916, a first difference is computed for snapshot shipping replication. The first difference is taken by taking a new snap on the first data storage system and calculating the difference between the new snap and the first snap of the pair of content-consistent snaps. For example, after changing from the continuous replication transport 1710 to the snapshot shipping transport 1720, the snapshot shipping transport 1720 initiates snapshot shipping replication by taking a new snap of the data object 1302. The local replication manager 162 on the first data storage system 116 computes a delta (like 1512) between the new snap and the first snap 1304. The delta represents changes in the data object 1302 since the pair of content-consistent snaps was taken.

At 1918, the difference (delta) computed at 1916 is sent to the second data storage system and applied to the second snap. For example, the replication managers 162 on the first and second data storage systems 116 and 416 coordinate to transfer the delta (like 1512) to the second data storage system 416 and to apply the delta to the second snap 1344. As the replica 1342 may have changed in the time since generating the pair of content-consistent snaps, the second snap 1344 provides a more accurate baseline for continued replication operations than does the replica 1342. The replication manager 162 then treats the second snap 1344 as the new replica 1342, i.e., as the common base to which deltas are to be applied going forward.

At 1920, snapshot shipping replication proceeds in the usual manner, e.g., by taking snaps of the data object 1302, computing deltas (like 1512), transferring the deltas to the second data storage system 416, and applying the deltas to the replica 1342 (previously the second snap 1344).

In some examples, the second snap 1344 of the pair of content-consistent snaps taken at 1912 may be regarded as optional. For example, it is possible to pause the IO stack 140 for processing IO requests on the data object 1302 on the first data storage system 116 when taking the pair of content-consistent snaps and not to resume IO processing on the data object 1302 until after changing replication transports. In this scenario, the second snap 1344 may be regarded as extraneous, as the replica 1342 itself provides an accurate common base for subsequent snapshot shipping replication activities once all IO's have been applied up to the marker 1332a. Thus, although content-consistent snaps are typically the means by which a common base is established for changing replication transports, content-consistency can still be achieved in some examples without requiring the second snap 1344.

FIG. 20 shows an example process 2000 of switching replication transports from the snapshot shipping transport 1720 to the continuous replication transport 1710. At 2010, replication operations are conducted for a data object between a first data storage system and a second data storage system using a snapshot shipping replication transport. For example, replication of the data object 1302 to the replica 1342 may proceed using the snapshot shipping transport 1720 in the manner essentially as described in connection with FIG. 15.

At 2012, a pair of content-consistent snaps is generated, including a first snap on the first data storage system and a second snap on the second data storage system. Content-consistency between the first snap 1304 and the second snap 1344 is achieved by taking the first snap 1304, computing a delta 1512 between the first snap 1304 and a previous snap, sending the delta to the second data storage system 416, and applying the delta 1512 to the replica 1342. The second snap 1344 is then taken of the replica 1342 after updating the replica with the delta 1512, such that the second snap 1344 is content-consistent with the first snap 1304. In some examples, generating the pair of content-consistent snaps is performed in response to an instruction (like 1320 of FIG. 15) for performing snap-and-replicate operations.

At 2014, the use of the snapshot shipping replication transport is disabled and the use of a continuous replication transport is enabled for replicating the data object. For example, the replication managers 162 on the first and second data storage systems 116 and 416 coordinate to change replication transports from the snapshot shipping transport 1720 to the continuous replication transport 1710. In an example, the pair of content-consistent snaps provides a common base for subsequent continuous replication operations. The changeover in replication transports may be further facilitated through the use of a snap signature 1306 applied to both snaps of the pair of content-consistent snaps and recognized by both the snapshot shipping replication transport 1720 and the continuous replication transport 1710.

At 2016, subsequent IO requests that designate write operations on the data object are mirrored to the replica on the second data storage system. For example, to maintain synchronization between the data object 1302 and the replica 1342, the IO stack 140 of the first data storage system 116 begins mirroring all IO requests designating write operations on the data object 1302 to the replica 1344 on the second data storage system 416 immediately after the pair of content-consistent snaps are taken, e.g., in the manner described in connection with FIG. 14, i.e., using the replication splitter 226 and replication appliances 160 and 460. In an example, the IO stack 140 on the first data storage system 116 pauses its processing of IO requests directed to the data object 1302 when taking the pair of content-consistent snaps and does not restore its processing of IO requests until after enabling the continuous replication transport 1710. Pausing the IO stack 140 in this manner ensures that no IO requests are applied to the data object 1302 without mirrored versions of the IO requests also being applied to the replica 1342 when switching transports.

Alternatively, no pausing is required and the replication transports are switched before taking the pair of content-consistent snaps. For example, continuous replication is commenced to begin splitting IO requests to the second data storage system 416, but the second replication appliance 460 buffers the IO requests until the content-consistent snaps have been taken. To generate the content-consistent snaps, a delta is computed between a first snap 1304 and its immediately previous snap. The delta is shipped to the second data storage system 416 and applied to the replica 1342. A second snap 1344 is then taken at the second site 420. The contents of the buffer 462 can then be de-staged to the replica 1342. In some examples, there is no need to hold back IO requests in the buffer 462, as mirrored IO requests can be allowed to update the replica 1344 continuously. As continuous replication preserves the order of IO requests, a later-arriving delta can be applied to the replica 1344 and a replica snap 1344 can be taken with no loss of consistency. In yet further examples, the above-described delta can be sent to the replica 1342 by the continuous replication transport 1710, i.e., along with incoming IO requests as they arrive. The continuous replication transport 1710 can then apply the delta to the replica 1342 and may use a marker 1332a, if desired, to indicate the point at which the replica snap 1344 is to be taken.

At 2018, continuous replication proceeds in the usual manner. For example, continuous replication of the data object 1302 proceeds in the manner described in connection with FIG. 14.

As was the case in the process 1900, the use of the second snap 1344 may be regarded as optional in the process 2000, as well. Once the replica 1342 is updated with the delta computed from the first snap 1304 using the snapshot shipping replication transport 1720, no second snap 1344 is needed to maintain consistency with the data object 1302, as the first snap 1304 and the replica 1342 have already assumed consistent states. According to this example, the continuous replication transport 1710 can apply subsequent changes directly to the replica 1342 going forward.

FIG. 21 shows an example process 2100 for changing back and forth between replication transports using content-consistent snaps as a common base for each transition. At 2110, replication operations are conducted for a data object between a first data storage system and a second data storage system using a first replication transport. For example, the first replication transport can be the continuous replication transport 1710 or the snapshot shipping transport 1720.

At 2112, a first pair of content-consistent snaps is generated, including a first snap on the first data storage system and a second snap on the second data storage system. For example, generating the first pair of content-consistent snaps is performed in response to an instruction (like 1320) for performing snap-and-replicate operations.

At 2114, the replication transport is switched from the first replication transport to a second replication transport using the first pair of content-consistent snaps as a common base to which subsequent replication operations are applied. For example, if the first replication transport was the continuous replication transport 1710, then this step involves switching to the snapshot shipping transport 1720. Conversely, if the first replication transport was the snapshot shipping transport 1720, then this step involves switching to the continuous replication transport 1710. The changeover in replication transports may be further facilitated through the use of a snap signature 1306 applied to both snaps of the first pair of content-consistent snaps and recognized by both replication transports.

At 2116, replication operations are conducted on the data object using the second replication transport. Use of the second replication transport may continue for any desired length of time, with the data object 1302 being updated as a result of incoming IO requests and the replica 1344 being updated as a result of replication operations.

At 2118, a second pair of content-consistent snaps is generated, including a third snap on the first data storage system and a fourth snap on the second data storage system. The third and fourth snaps are analogous to the first and second snaps above, but taken at a later time and during operation of the second replication transport. Generating the second pair of content-consistent snaps may be performed in response to another instruction (like 1320) for performing snap-and-replicate operations.

At 2120, the replication transport is switched from the second replication transport back to the first replication transport using the second pair of content-consistent snaps as a common base to which subsequent replication operations are applied. This step is analogous to step 2114 but switches back to the original replication transport.

The process 2100 thus demonstrates that replication operations can be switched back and forth between different replication transports with no loss of consistency between a data object and its replica through the use of pairs of content-consistent snaps as common bases. Data storage systems can generate each pair of content-consistent snaps in response to an instruction (1320) to perform snap-and-replicate operations, but this is not required. Also, changeovers in replication transports can be facilitated using snap signatures recognized by both the continuous replication transport 1710 and the snapshot shipping transport 1720 and applied to both snaps of each pair of content-consistent snaps. However, the use of compatible snap signatures is also not required.

Having described certain embodiments, numerous alternative embodiments or variations can be made. For example, although embodiments have been described for switching between continuous replication and snapshot shipping replication transports, embodiments can also be made using the techniques described herein for switching between synchronous continuous replication and asynchronous continuous replication transports. Embodiments can also be made using the techniques described herein for switching between a replication transport configured with one set of settings and the same replication transport configured with another set of settings.

Also, although the above-described snap-and-replicate operations have been shown and described for use with two data storage systems (116 and 416), the same or similar operations can be extended to additional data storage systems. In an example, a data object has multiple replica sites and replication operations are conducted with each of them. In response to an instruction to perform snap-and-replicate operations, data storage systems generate content-consistent snaps, which include a "first" snap at a source site and a respective "second" snap at each of the replica sites. The data storage systems can apply a snap signature generated for the "first" snap to each of the "second" snaps at the replica sites, such that any of the content-consistent snaps may be used interchangeably.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1650 in FIGS. 16-21). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Those skilled in the art will therefore understand that various changes in form and detail may be made to the embodiments disclosed herein without departing from the scope of the invention.

What is claimed is:

1. A method of managing data protection for a data object stored on a first data storage system, the method comprising:
   conducting replication operations on the data object between the first data storage system and a second data storage system to maintain a replica of the data object on the second data storage system as the data object on the first data storage system changes;
   in a course of conducting the replication operations for replicating the data object on the first data storage system to the replica on the second data storage system, generating a pair of content-consistent snaps, including a first snap of the data object on the first data storage system and a second snap of the replica of the data object on the second data storage system; and
   applying a snap signature, generated to identify the first snap from among other snaps in the first data storage system, to the second snap in the second data storage system, the second snap thereby having the same snap signature as the first snap, the second snap thereby providing a parallel copy of the first snap, the parallel copy having been independently generated on the second data storage system from the replica of the data object on the second data storage system,
   wherein the data object in the first data storage system is realized in the form of a container file stored in an internal, container file system in the first data storage system,
   wherein the replica in the second data storage system is realized in the form of a container file stored in an internal, container file system in the second data storage system,
   wherein conducting the replication operations includes:
      receiving a sequence of IO requests by the first data storage system, each of the sequence of IO requests specifying respective data to be written to the data object;
      mirroring each of the sequence of IO requests to the second data storage system to effect write operations of the data specified by each of the sequence of IO requests on the replica; and
      writing the data specified by each of the sequence of IO requests to the data object on the first data storage system,
   wherein mirroring the sequence of IO requests includes operating a replication splitter in an IO stack of the first data storage system, the replication splitter (i) receiving each of the sequence of IO requests, (ii) mirroring each of the sequence of IO requests to the second data storage system to effect respective write operations on the replica, and (iii) passing each of the sequence of IO requests farther down the IO stack on the first data storage system to effect respective write operations on the data object, and wherein the method further comprises, in response to the first data storage system encountering an instruction to perform a snap-and-replicate operation:
the replication sputter sending a marker to the second data storage system, the marker designating a point relative to the sequence of IO requests at which the pair of content-consistent snaps is to be generated,
wherein generating the pair of content-consistent snaps includes (i) the first data storage system generating the first snap of the data object after applying to the data object the write operations specified by the sequence of IO requests up to the point designated by the marker, and (ii) the second data storage system generating the second snap of the replica after applying to the replica the write operations specified by the sequence of IO requests mirrored to the second data storage system up to the point designated by the marker.

2. The method of claim 1, wherein the data object is one of (i) a LUN (Logical Unit Number), (ii) a file system, or (iii) a vVOL (Virtual Volume).

3. The method of claim 1, further comprising generating the snap signature of the first snap by the first data storage system and directing the replication splitter to send a metadata IO containing the snap signature to the second data storage system, wherein applying the snap signature to the second snap includes storing the snap signature received in the metadata IO in connection with the second snap on the second data storage system.

4. The method of claim 1, wherein encountering the instruction to perform the snap-and-replicate operation occurs in response to a user of the first data storage system directing the first data storage system to snap and replicate the data object.

5. The method of claim 1, further comprising:
generating multiple pairs of content-consistent snaps, each pair of content-consistent snaps including a respective first snap and a respective second snap;
continuing to store a set of second snaps of the multiple pairs of content-consistent snaps on the second data storage system after deleting corresponding first snaps of the multiple pairs of content-consistent snaps from the first data storage system, such that the second data storage system acts as a repository of second snaps of the data object even after the first data storage system no longer stores the corresponding first snaps.

6. The method of claim 1, further comprising:
suspending use of the replication splitter for conducting the replication operations on the data object; and
commencing snapshot shipping replication operations on the data object between the first data storage system and the second data storage system,
wherein the snapshot shipping replication operations include—
generating snaps of the data object on the first data storage system over time;
computing deltas between pairs of consecutive snaps of the data object;
sending the deltas to the second data storage system; and
applying the deltas to the replica to update the replica to reflect changes in the data object over time.

7. The method of claim 6, further comprising, after commencing snapshot shipping replication operations:
generating a snap of the data object (a third snap) on the first data storage system;
computing a delta between the third snap and a previous snap of the data object taken by the first data storage system;
sending the delta from the first data storage system to the second data storage system;
applying the delta to the replica on the second data storage system; and
generating a snap of the replica (a fourth snap) after applying the delta to the replica.

8. The method of claim 1, wherein conducting the replication operations includes:
generating snaps of the data object on the first data storage system over time;
computing deltas between pairs of consecutive snaps of the data object;
sending the deltas to the second data storage system; and
applying the deltas to the replica to update the replica to reflect changes in the data object over time,
wherein generating the pair of content-consistent snaps includes:
generating the first snap in response to the first data storage system encountering an instruction to perform a snap-and-replicate operation;
computing a new delta between the first snap and a previous snap of the data object on the first data storage system;
sending the new delta from the first data storage system to the second data storage system;
applying the new delta to the replica on the second data storage system; and
generating the second snap as a snap of the replica after applying the new delta to the replica on the second data storage system.

9. The method of claim 8, further comprising generating the snap signature that identifies the first snap on the first data storage system and sending the snap signature to the second data storage system, wherein applying the snap signature to the second snap includes storing the snap signature of the first snap in connection with the second snap on the second data storage system.

10. The method of claim 8, further comprising suspending use of snaps for conducting the replication operations on the data object and commencing second replication operations, the second replication operations including operating a replication splitter in an IO stack of the first data storage system, the replication splitter (i) receiving each of a sequence of IO requests arriving at the first data storage system, (ii) mirroring each of the sequence of IO requests to the second data storage system to effect respective write operations on the replica, and (iii) passing each of the sequence of IO requests farther down the IO stack on the first data storage system to effect respective write operations on the data object.

11. The method of claim 10, further comprising, after commencing the second replication operations:
the replication splitter sending a marker to the second data storage system, the marker designating a point relative to the sequence of IO requests at which a second pair of content-consistent snaps is to be generated,
wherein generating the second pair of content-consistent snaps includes (i) the first data storage system generating a snap of the data object (a third snap) after applying to the data object the write operations specified by the sequence of IO requests up to the point designated by the marker, and (ii) the second data storage system generating a snap of the replica (a fourth snap) after applying to the replica the write operations specified by the sequence of mirrored IO requests up to the point designated by the marker.

12. The method of claim 8, further comprising:
generating multiple pairs of content-consistent snaps, each pair of content-consistent snaps including a respective first snap and a respective second snap;
continuing to store a set of second snaps of the multiple pairs of content-consistent snaps on the second data storage system after deleting corresponding first snaps of the multiple pairs of content-consistent snaps from the first data storage system, such that the second data storage system acts as a repository of second snaps of the data object even after the first data storage system no longer stores the corresponding first snaps.

13. A system comprising a first data storage system and a second data storage system coupled to the first data storage system, the first data storage system and the second data storage system constructed and arranged to:
conduct replication operations between the first data storage system and the second data storage system to maintain a replica of a data object stored on the first data storage system on the second data storage system as the data object on the first data storage system changes;
in a course of conducting the replication operations for replicating the data object on the first data storage system to the replica on the second data storage system, generate a pair of content-consistent snaps, including a first snap of the data object on the first data storage system and a second snap of the replica of the data object on the second data storage system; and
apply a snap signature, generated to identify the first snap from among other snaps in the first data storage system, to the second snap in the second data storage system, the second snap thereby having the same snap signature as the first snap, the second snap thereby providing a parallel copy of the first snap, the parallel copy having been independently generated on the second data storage system from the replica of the data object on the second data storage system,
wherein the data object in the first data storage system is realized in the form of a container file stored in an internal, container file system in the first data storage system,
wherein the replica in the second data storage system is realized in the form of a container file stored in an internal, container file system in the second data storage system,
wherein, when constructed and arranged to conduct the replication operations, the first data storage system and the second data storage system are further constructed and arranged to:
receive a sequence of IO requests by the first data storage system, each of the sequence of IO requests specifying respective data to be written to the data object;
mirror each of the sequence of IO requests to the second data storage system to effect write operations of the data specified by each of the sequence of IO requests on the replica; and
write the data specified by each of the sequence of IO requests to the data object on the first data storage system,
wherein the data object forms a consistency group with a set of other data objects within the first data storage system, and wherein, for each of the set of other data objects of the consistency group, the first data storage system and the second data storage system are further constructed and arranged to:
conduct replication operations on the data object between the first data storage system and a second data storage system to maintain a replica of the data object on the second data storage system as the data object on the first data storage system changes;
in a course of conducting the replication operations for replicating the data object on the first data storage system to the replica on the second data storage system, generate a pair of content-consistent snaps, including a first snap of the data object on the first data storage system and a second snap of the replica of the data object on the second data storage system; and
apply a snap signature that identifies the first snap from among other snaps to both the first snap and the second snap, the second snap thereby having the same snap signature as the first snap and providing a parallel copy of the first snap that has been independently generated on the second data storage system from the replica of the data object on the second data storage system,
wherein the first snap of any of the data objects in the consistency group on the first data storage system is taken at the same point relative to IO requests processed by the first data storage system as the first snap of any of the other data objects in the consistency group, and
wherein the second snap of any of the replicas of the data objects in the consistency group on the second data storage system is taken at the same point relative to IO requests processed by the second data storage system as the second snap of any of the other replicas of the data objects in the consistency group.

14. A computer program product including a set of non-transitory computer-readable media having instructions which, when executed by one or more processors, cause the processors to perform a method of managing data protection for a data object stored on the first data storage system, the method comprising:
conducting replication operations on the data object between the first data storage system and a second data storage system to maintain a replica of the data object on the second data storage system as the data object on the first data storage system changes;
in a course of conducting the replication operations for replicating the data object on the first data storage system to the replica on the second data storage system, generating a pair of content-consistent snaps, including a first snap of the data object on the first data storage system and a second snap of the replica of the data object on the second data storage system; and
applying a snap signature, generated to identify the first snap from among other snaps in the first data storage system, to the second snap in the second data storage system, the second snap thereby having the same snap signature as the first snap, the second snap thereby providing a parallel copy of the first snap, the parallel copy having been independently generated on the second data storage system from the replica of the data object on the second data storage system,
wherein the data object in the first data storage system is realized in the form of a container file stored in an internal, container file system in the first data storage system, wherein the replica in the second data storage system is realized in the form of a container file stored in an internal, container file system in the second data storage system, wherein conducting the replication operations includes:
generating snaps of the data object on the first data storage system over time;
computing deltas between pairs of consecutive snaps of the data object;
sending the deltas to the second data storage system; and
applying the deltas to the replica to update the replica to reflect changes in the data object over time,
wherein generating the pair of content-consistent snaps includes:
generating the first snap in response to the first data storage system encountering an instruction to perform a snap-and-replicate operation;
computing a new delta between the first snap and a previous snap of the data object on the first data storage system;
sending the new delta from the first data storage system to the second data storage system;
applying the new delta to the replica on the second data storage system; and
generating the second snap as a snap of the replica after applying the new delta to the replica on the second data storage system, and
wherein the method further comprises suspending use of snaps for conducting the replication operations on the data object and commencing second replication operations,
the second replication operations including operating a replication splitter in an IO stack of the first data storage system, the replication splitter (i) receiving each of a sequence of IO requests arriving at the first data storage system, (ii) mirroring each of the sequence of IO requests to the second data storage system to effect respective write operations on the replica, and (iii) passing each of the sequence of IO requests farther down the IO stack on the first data storage system to effect respective write operations on the data object.

15. The computer program product of claim 14, further comprising generating the snap signature that identifies the first snap on the first data storage system and sending the snap signature to the second data storage system, wherein applying the snap signature to the second snap includes storing the snap signature of the first snap in connection with the second snap on the second data storage system.

16. A computer program product including a set of non-transitory computer-readable media having instructions which, when executed by one or more processors, cause the processors to perform a method of managing data protection for a data object stored on the first data storage system, the method comprising:
conducting replication operations on the data object between the first data storage system and a second data storage system to maintain a replica of the data object on the second data storage system as the data object on the first data storage system changes;
in a course of conducting the replication operations for replicating the data object on the first data storage system to the replica on the second data storage system, generating a pair of content-consistent snaps, including a first snap of the data object on the first data storage system and a second snap of the replica of the data object on the second data storage system; and
applying a snap signature, generated to identify the first snap from among other snaps in the first data storage system, to the second snap in the second data storage system, the second snap thereby having the same snap signature as the first snap, the second snap thereby providing a parallel copy of the first snap, the parallel copy having been independently generated on the second data storage system from the replica of the data object on the second data storage system,
wherein the data object in the first data storage system is realized in the form of a container file stored in an internal, container file system in the first data storage system,
wherein the replica in the second data storage system is realized in the form of a container file stored in an internal, container file system in the second data storage system,
wherein conducting the replication operations includes:
generating snaps of the data object on the first data storage system over time;
computing deltas between pairs of consecutive snaps of the data object;
sending the deltas to the second data storage system; and
applying the deltas to the replica to update the replica to reflect changes in the data object over time,
wherein generating the pair of content-consistent snaps includes:
generating the first snap in response to the first data storage system encountering an instruction to perform a snap-and-replicate operation;
computing a new delta between the first snap and a previous snap of the data object on the first data storage system;
sending the new delta from the first data storage system to the second data storage system;
applying the new delta to the replica on the second data storage system; and
generating the second snap as a snap of the replica after applying the new delta to the replica on the second data storage system, and
wherein the method further comprises, in response to the first data storage system encountering an instruction to perform another snap-and-replicate operation after commencing second replication operations:
the replication splitter sending a marker to the second data storage system, the marker designating a point relative to the sequence of IO requests at which a second pair of content-consistent snaps is to be generated,
wherein generating the second pair of content-consistent snaps includes (i) the first data storage system generating a snap of the data object (a third snap) after applying to the data object the write operations specified by the sequence of IO requests up to the point designated by the marker, and (ii) the second data storage system generating a snap of the replica (a fourth snap) after applying to the replica the write operations specified by the sequence of mirrored IO requests up to the point designated by the marker.

* * * * *